United States Patent
Wilkins et al.

(10) Patent No.: US 7,563,351 B2
(45) Date of Patent: Jul. 21, 2009

(54) WATER TREATMENT SYSTEM AND METHOD

(75) Inventors: Frederick Wilkins, Pepperell, MA (US); Evgeniya Freydina, Acton, MA (US); Aytac Sezgi, Bedford, NH (US); Reshma Madhusudan, Arlington Heights, IL (US); Anil D. Jha, Lincoln, MA (US)

(73) Assignee: Siemens Water Technologies Holding Corp., Warrendale, PA (US)

( * ) Notice: Subject to any disclaimer, the term of this patent is extended or adjusted under 35 U.S.C. 154(b) by 861 days.

(21) Appl. No.: 10/712,163

(22) Filed: Nov. 13, 2003

(65) Prior Publication Data

US 2005/0103644 A1    May 19, 2005

(51) Int. Cl.
*B01D 61/44* (2006.01)

(52) U.S. Cl. .................. 204/524; 204/525; 204/533; 204/536; 204/632

(58) Field of Classification Search .......... 204/632, 204/524, 525, 533, 536
See application file for complete search history.

(56) References Cited

U.S. PATENT DOCUMENTS

| | | |
|---|---|---|
| 2,514,415 A | 7/1950 | Rasch |
| 2,681,319 A | 6/1954 | Bodamer |
| 2,681,320 A | 6/1954 | Bodamer |
| 2,788,319 A | 4/1957 | Pearson |
| 2,794,777 A | 6/1957 | Pearson |
| 2,815,320 A | 12/1957 | Kollsman |
| 2,854,394 A | 9/1958 | Kollsman |
| 2,923,674 A | 2/1960 | Kressman |

(Continued)

FOREIGN PATENT DOCUMENTS

AU    B-18629/92    10/1992

(Continued)

OTHER PUBLICATIONS

Yoran Oren et al., "Studies on Polarity Reversal with Continuous Deionization," *Desalination*, Elsevier Scientific Publishing Co., Amsterdam, NL, vol. 86, No. 2, Jun. 1, 1992, pp. 155-171.

(Continued)

*Primary Examiner*—Arun S Phasge

(57) ABSTRACT

A water treatment system provides treated or softened water to a point of use by removing a portion of any hardness-causing species contained in water from a point-of-entry coming from a water source, such as municipal water, well water, brackish water and water containing foulants. The water treatment system typically treats the water containing at least some undesirable species before delivering the treated water to a point of use. The water treatment system has a controller for adjusting or regulating at least one operating parameter of the treatment system or a component of the water treatment system to optimize the operation and performance of the system or components of the system. A flow regulator regulates a waste stream flow to drain and can be operated to recirculate fluid through electrode or concentrating compartments of an electrochemical device and can opened and closed intermittently according to a predetermined schedule or based on an operating parameter of the water treatment system. The flow regulator can also be charged so that ionic species can be generated in the surrounding fluid, which, in turn, can lower the pH of the surrounding fluid.

25 Claims, 11 Drawing Sheets

U.S. PATENT DOCUMENTS

| | | |
|---|---|---|
| 2,943,989 A | 7/1960 | Kollsman |
| 3,014,855 A | 12/1961 | Kressman |
| 3,074,864 A * | 1/1963 | Gaysowski ................ 205/702 |
| 3,099,615 A | 7/1963 | Kollsman |
| 3,148,687 A | 9/1964 | Dosch |
| 3,149,061 A | 9/1964 | Parsi |
| 3,149,062 A | 9/1964 | Gottschal et al. |
| 3,165,460 A | 1/1965 | Zang et al. |
| 3,291,713 A | 12/1966 | Parsi |
| 3,330,750 A | 7/1967 | McRae et al. |
| 3,341,441 A | 9/1967 | Giuffrida et al. |
| 3,375,208 A | 3/1968 | Duddy |
| 3,627,703 A | 12/1971 | Kojima et al. |
| 3,630,378 A | 12/1971 | Bauman |
| 3,645,884 A | 2/1972 | Gilliland |
| 3,686,089 A | 8/1972 | Korngold |
| 3,755,135 A | 8/1973 | Johnson |
| 3,869,375 A | 3/1975 | Ono et al. |
| 3,869,376 A | 3/1975 | Tejeda |
| 3,870,033 A | 3/1975 | Faylor et al. |
| 3,876,565 A | 4/1975 | Takashima et al. |
| 3,989,615 A | 11/1976 | Kiga et al. |
| 4,032,452 A | 6/1977 | Davis |
| 4,033,850 A | 7/1977 | Kedem et al. |
| 4,089,758 A | 5/1978 | McAloon |
| 4,102,752 A | 7/1978 | Rugh, II |
| 4,116,889 A | 9/1978 | Chlanda et al. |
| 4,119,581 A | 10/1978 | Rembaum et al. |
| 4,130,473 A | 12/1978 | Eddleman |
| 4,153,761 A | 5/1979 | Marsh |
| 4,167,551 A | 9/1979 | Tamura et al. |
| 4,191,811 A | 3/1980 | Hodgdon |
| 4,197,206 A | 4/1980 | Karn |
| 4,216,073 A | 8/1980 | Goldstein |
| 4,217,200 A | 8/1980 | Kedem et al. |
| 4,226,688 A | 10/1980 | Kedem et al. |
| 4,228,000 A | 10/1980 | Hoeschler |
| 4,294,933 A | 10/1981 | Kihara et al. |
| 4,298,442 A | 11/1981 | Giuffrida |
| 4,321,145 A | 3/1982 | Carlson |
| 4,330,654 A | 5/1982 | Ezzell et al. |
| 4,358,545 A | 11/1982 | Ezzell et al. |
| 4,374,232 A | 2/1983 | Davis |
| 4,430,226 A | 2/1984 | Hegde et al. |
| 4,465,573 A | 8/1984 | O'Hare |
| 4,473,450 A | 9/1984 | Nayak et al. |
| 4,505,797 A | 3/1985 | Hodgdon et al. |
| 4,574,049 A | 3/1986 | Pittner |
| 4,614,576 A | 9/1986 | Goldstein |
| 4,632,745 A | 12/1986 | Giuffrida et al. |
| 4,636,296 A | 1/1987 | Kunz |
| 4,655,909 A | 4/1987 | Furuno |
| 4,661,411 A | 4/1987 | Martin et al. |
| 4,671,863 A | 6/1987 | Tejeda |
| 4,687,561 A | 8/1987 | Kunz |
| 4,702,810 A | 10/1987 | Kunz |
| 4,707,240 A | 11/1987 | Parsi et al. |
| 4,747,929 A | 5/1988 | Siu et al. |
| 4,747,955 A | 5/1988 | Kunin |
| 4,751,153 A | 6/1988 | Roth |
| 4,753,681 A | 6/1988 | Giuffrida et al. |
| 4,770,793 A | 9/1988 | Treffry-Goatley et al. |
| 4,804,451 A | 2/1989 | Palmer |
| 4,808,287 A | 2/1989 | Hark |
| 4,849,102 A | 7/1989 | Latour et al. |
| 4,871,431 A | 10/1989 | Parsi |
| 4,872,958 A | 10/1989 | Suzuki et al. |
| 4,915,803 A | 4/1990 | Morris |
| 4,925,541 A | 5/1990 | Giuffrida et al. |
| 4,931,160 A | 6/1990 | Giuffrida |
| 4,956,071 A | 9/1990 | Giuffrida et al. |
| 4,964,970 A | 10/1990 | O'Hare |
| 4,969,983 A | 11/1990 | Parsi |
| 4,983,267 A | 1/1991 | Moeglich et al. |
| 5,026,465 A | 6/1991 | Katz et al. |
| 5,030,672 A | 7/1991 | Hann et al. |
| 5,066,375 A | 11/1991 | Parsi et al. |
| 5,066,402 A | 11/1991 | Anselme et al. |
| 5,073,268 A | 12/1991 | Saito et al. |
| 5,082,472 A | 1/1992 | Mallouk et al. |
| 5,084,148 A | 1/1992 | Kazcur et al. |
| 5,092,970 A | 3/1992 | Kaczur et al. |
| 5,106,465 A | 4/1992 | Kaczur et al. |
| 5,116,509 A | 5/1992 | White |
| 5,120,416 A | 6/1992 | Parsi et al. |
| 5,126,026 A | 6/1992 | Chlanda |
| 5,128,043 A | 7/1992 | Wildermuth |
| 5,154,809 A | 10/1992 | Oren et al. |
| 5,166,220 A | 11/1992 | McMahon |
| 5,176,828 A | 1/1993 | Proulx |
| 5,196,115 A | 3/1993 | Andelman |
| 5,203,976 A | 4/1993 | Parsi et al. |
| 5,211,823 A | 5/1993 | Giuffrida et al. |
| 5,223,103 A | 6/1993 | Kazcur et al. |
| H1206 H | 7/1993 | Thibodeax et al. |
| 5,240,579 A | 8/1993 | Kedem |
| 5,254,227 A | 10/1993 | Cawlfield et al. |
| 5,259,936 A | 11/1993 | Ganzi |
| 5,286,354 A | 2/1994 | Bard et al. |
| 5,292,422 A | 3/1994 | Liang et al. |
| 5,308,466 A | 5/1994 | Ganzi et al. |
| 5,308,467 A | 5/1994 | Sugo et al. |
| 5,316,637 A | 5/1994 | Ganzi et al. |
| 5,346,624 A | 9/1994 | Libutti et al. |
| 5,346,924 A | 9/1994 | Giuffrida |
| 5,356,849 A | 10/1994 | Matviya et al. |
| 5,358,640 A | 10/1994 | Zeiher et al. |
| 5,376,253 A | 12/1994 | Rychen et al. |
| 5,411,641 A | 5/1995 | Trainham, III et al. |
| 5,425,858 A | 6/1995 | Farmer |
| 5,425,866 A | 6/1995 | Sugo et al. |
| 5,434,020 A | 7/1995 | Cooper |
| 5,444,031 A | 8/1995 | Hayden |
| 5,451,309 A | 9/1995 | Bell |
| 5,458,787 A | 10/1995 | Rosin et al. |
| 5,460,725 A | 10/1995 | Stringfield |
| 5,460,728 A | 10/1995 | Klomp et al. |
| 5,489,370 A | 2/1996 | Lomasney et al. |
| 5,503,729 A | 4/1996 | Elyanow et al. |
| 5,518,626 A | 5/1996 | Birbara et al. |
| 5,518,627 A | 5/1996 | Tomoi et al. |
| 5,536,387 A | 7/1996 | Hill et al. |
| 5,538,611 A | 7/1996 | Otowa |
| 5,538,655 A | 7/1996 | Fauteux et al. |
| 5,539,002 A | 7/1996 | Watanabe |
| 5,547,551 A | 8/1996 | Bahar et al. |
| 5,558,753 A | 9/1996 | Gallagher et al. |
| 5,580,437 A | 12/1996 | Trainham, III et al. |
| 5,584,981 A | 12/1996 | Turner et al. |
| 5,593,563 A | 1/1997 | Denoncourt et al. |
| 5,599,614 A | 2/1997 | Bahar et al. |
| 5,670,053 A | 9/1997 | Collentro et al. |
| 5,679,228 A | 10/1997 | Elyanow et al. |
| 5,679,229 A | 10/1997 | Goldstein et al. |
| 5,714,521 A | 2/1998 | Kedem et al. |
| RE35,741 E | 3/1998 | Oren et al. |
| 5,736,023 A | 4/1998 | Gallagher et al. |
| 5,759,373 A | 6/1998 | Terada et al. |
| 5,762,774 A | 6/1998 | Tessier |
| 5,766,479 A | 6/1998 | Collentro et al. |
| 5,788,826 A | 8/1998 | Nyberg |
| 5,804,055 A | 9/1998 | Coin et al. |
| 5,814,197 A | 9/1998 | Batchelder et al. |
| 5,837,124 A | 11/1998 | Su et al. |

| | | | | | | |
|---|---|---|---|---|---|---|
| 5,858,191 A | 1/1999 | DiMascio et al. | | EP | 0 503 589 A1 | 9/1992 |
| 5,868,915 A | 2/1999 | Ganzi et al. | | EP | 0 621 072 A2 | 10/1994 |
| 5,891,328 A | 4/1999 | Goldstein | | EP | 0 621 072 B1 | 10/1994 |
| 5,925,240 A | 7/1999 | Wilkins et al. | | EP | 0 680 932 A2 | 11/1995 |
| 5,928,807 A | 7/1999 | Elias | | EP | 0803474 A2 | 10/1997 |
| 5,954,935 A | 9/1999 | Neumeister et al. | | EP | 0 870 533 A1 | 10/1998 |
| 5,961,805 A | 10/1999 | Terada et al. | | EP | 1 068 901 A2 | 1/2001 |
| 5,980,716 A | 11/1999 | Horinouchi et al. | | EP | 1068901 A2 | 1/2001 |
| 6,056,878 A | 5/2000 | Tessier et al. | | EP | 1075 868 A2 | 2/2001 |
| 6,099,716 A | 8/2000 | Molter et al. | | EP | 1 101 790 A1 | 5/2001 |
| 6,103,125 A | 8/2000 | Kuepper | | EP | 1 106 241 A1 | 6/2001 |
| 6,126,805 A | 10/2000 | Batchelder et al. | | EP | 1172145 A2 | 1/2002 |
| RE36,972 E | 11/2000 | Baker et al. | | EP | 1222954 A1 | 7/2002 |
| 6,146,524 A | 11/2000 | Story | | EP | 1506941 A1 | 2/2005 |
| 6,149,788 A | 11/2000 | Tessier et al. | | GB | 776469 | 6/1957 |
| 6,171,374 B1 | 1/2001 | Barton et al. | | GB | 877239 | 9/1961 |
| 6,187,154 B1 | 2/2001 | Yamaguchi et al. | | GB | 880344 | 10/1961 |
| 6,187,162 B1 | 2/2001 | Mir | | GB | 893051 | 4/1962 |
| 6,190,528 B1 | 2/2001 | Li et al. | | GB | 942762 | 11/1963 |
| 6,190,553 B1 | 2/2001 | Lee | | GB | 1048026 | 11/1966 |
| 6,190,558 B1 | 2/2001 | Robbins | | GB | 1137679 | 12/1968 |
| 6,193,869 B1 | 2/2001 | Towe et al. | | GB | 1 381 681 A | 1/1975 |
| 6,197,174 B1 | 3/2001 | Barber et al. | | GB | 1448533 | 9/1976 |
| 6,197,189 B1 | 3/2001 | Schwartz et al. | | JP | 54-5888 | 1/1979 |
| 6,214,204 B1 | 4/2001 | Gadkaree et al. | | JP | 07-155750 | 6/1995 |
| 6,228,240 B1 | 5/2001 | Terada et al. | | JP | 07-265865 | 10/1995 |
| 6,235,166 B1 | 5/2001 | Towe et al. | | JP | 09-253643 | 9/1997 |
| 6,248,226 B1 | 6/2001 | Shinmei et al. | | JP | 11-42483 | 2/1999 |
| 6,254,741 B1 | 7/2001 | Stuart et al. | | JP | 2001-79358 | 3/2001 |
| 6,258,278 B1 | 7/2001 | Tonelli et al. | | JP | 2001-79553 | 3/2001 |
| 6,267,891 B1 | 7/2001 | Tonelli et al. | | JP | 2001-104960 | 4/2001 |
| 6,274,019 B1 | 8/2001 | Kuwata | | JP | 2001-113137 | 4/2001 |
| 6,284,124 B1 | 9/2001 | DiMascio et al. | | JP | 2001-113279 | 4/2001 |
| 6,284,399 B1 | 9/2001 | Oko et al. | | JP | 2001-113280 | 4/2001 |
| 6,296,751 B1 | 10/2001 | Mir | | JP | 2001-121152 | 5/2001 |
| 6,303,037 B1 | 10/2001 | Tamura et al. | | JP | 2005007347 | 1/2005 |
| 6,375,812 B1 | 4/2002 | Leonida | | JP | 2005007348 | 1/2005 |
| 6,402,916 B1 | 6/2002 | Sampson et al. | | RO | 114 874 B | 8/1999 |
| 6,402,917 B1 | 6/2002 | Emery et al. | | SU | 216622 | 11/1972 |
| 6,482,304 B1 | 11/2002 | Emery et al. | | SU | 990256 | 1/1983 |
| 6,607,647 B2 | 8/2003 | Wilkins et al. | | SU | 1118389 | 10/1984 |
| 6,607,668 B2 | 8/2003 | Rela | | WO | WO 92/11089 | 7/1992 |
| 6,627,073 B2 | 9/2003 | Hirota et al. | | WO | WO 95/32052 | 11/1995 |
| 6,648,307 B2 | 11/2003 | Nelson et al. | | WO | WO 95/32791 | 12/1995 |
| 6,649,037 B2 | 11/2003 | Liang et al. | | WO | WO 96/22162 | 7/1996 |
| 6,766,812 B1 | 7/2004 | Gadini | | WO | WO 97/25147 | 7/1997 |
| 6,783,666 B2 | 8/2004 | Takeda et al. | | WO | WO 97/46491 | 12/1997 |
| 6,808,608 B2 | 10/2004 | Srinivasan et al. | | WO | WO 97/46492 | 12/1997 |
| 6,824,662 B2 | 11/2004 | Liang et al. | | WO | WO 98/11987 | 3/1998 |
| 2001/0003329 A1 | 6/2001 | Sugaya et al. | | WO | WO 98/17590 | 4/1998 |
| 2002/0092769 A1 | 7/2002 | Garcia et al. | | WO | WO 98/20972 | 5/1998 |
| 2002/0189951 A1 | 12/2002 | Liang et al. | | WO | WO 98/58727 | 12/1998 |
| 2003/0080467 A1 | 5/2003 | Andrews et al. | | WO | WO 99/39810 | 8/1999 |
| 2003/0089609 A1 | 5/2003 | Liang et al. | | WO | WO 00/30749 | 6/2000 |
| 2003/0098266 A1 | 5/2003 | Shiue et al. | | WO | WO 00/64325 A2 | 11/2000 |
| 2003/0155243 A1 | 8/2003 | Sferrazza | | WO | WO 00/75082 A1 | 12/2000 |
| 2003/0201235 A1 | 10/2003 | Chidambaran et al. | | WO | WO01/30229 * | 5/2001 |
| 2004/0079700 A1 | 4/2004 | Wood et al. | | WO | WO 01/49397 A1 | 7/2001 |
| 2004/0089551 A1 | 5/2004 | Liang et al. | | WO | WO 02/04357 A1 | 1/2002 |
| 2005/0109703 A1 | 5/2005 | Newenhizen | | WO | WO 02/14224 A1 | 2/2002 |
| 2006/0060532 A1 | 3/2006 | Davis | | WO | WO 03/086590 A1 | 10/2003 |
| 2006/0231403 A1 | 10/2006 | Riviello | | | | |

FOREIGN PATENT DOCUMENTS

| | | |
|---|---|---|
| CA | 2316012 A1 | 11/2001 |
| CN | 1044411 A | 8/1990 |
| DE | 1 201 055 | 9/1965 |
| DE | 3238280 A1 | 4/1984 |
| DE | 4016000 A1 | 11/1991 |
| DE | 44 18 812 A1 | 12/1995 |
| DE | 199 42 347 A1 | 3/2001 |
| EP | 0170895 A2 | 2/1986 |

OTHER PUBLICATIONS

Wood, J.H. et al., "Continuous Electrodeionisation: Module Design Considerations for the Production of High Purity Water," *Proc. Of IEX at the Millenium*, Jul. 16, 2000, pp. 44-51.

ASTM, "Standard Practice for Calculation and Adjustment of the Langelier Saturation Index for Reverse Osmosis," Designation: D3739-94 (Reapproved 1998), pp. 1-4.

Calay, J.-C. et al., "The Use of EDI to Reduce the Ammonia Concentration in Steam Generators Blowdown of PWR Nuclear Power Plants," *PowerPlant Chemistry*, vol. 2, No. 8, 2000, pp. 467-470.

Dimascio et al., "Continuous Electrodeionization: Production of High-Purity Water without Regeneration Chemicals," The Electrochemical Society *Interface*, Fall 1998, pp. 26-29.

Dimascio et al., "Electrodiaresis Polishing (An Electrochemical Deionization Process)," date unknown, pp. 164-172.

Dow Chemical, "DOWEX Marathon A Ion Exchange Resin," published Dec. 1999, Product Literature reprinted from www.dow.com.

Dow Chemical, "DOWEX Marathon A2 Ion Exchange Resin," published Nov. 1998, Product Literature reprinted from www.dow.com.

DUPONT Nafion PFSA Products, Technical Information, "Safe Handling and Use of Perfluorosulfonic Acid Products," Feb. 2004. 4 pages.

Farmer et al., Capacitive Deionization of $NH_4ClO_4$ Solutions with Carbon Aerogel Electrodes, *J. Appl. Electro-Chemistry*, vol. 26, (1996), pp. 1007-1018.

FDA, "Guide to Inspections of High Purity Water Systems," printed from www.fda.gov. on Mar. 30, 2004, date unknown.

Ganzi, G.C. et al., "Electrodeionization: Theory and Practice of Continuous Electrodeionization," *Ultrapure Water*, Jul./Aug. 1997, pp. 64-69.

G.J. Gittens et al., "The Application of Electrodialysis to Demineralisation," A.I.Ch.E.-I.Chem.E. Symposium Series No. 9, 1965 (London: Instn chem. Engrs), pp. 79-83.

Glueckauf, "Electro-Deionisation Through a Packed Bed," *British Chemical Engineering*, Dec. 1959, pp. 646-651.

Hobro et al., "Recycling of Chromium from Metal Finishing Waste Waters Using Electrochemical Ion Exchange (EIX)," 1994, pp. 173-183, publication and date unknown.

Jha, Anil D. et al., "CEDI: Selecting the Appropriate Configuration," reprinted from *Power Engineering*, Aug. 2000 edition.

Johnson et al., "Desalting by Means of Porous Carbon Electrodes," *Electrochemical Technology*, vol. 118, No. 3, Mar. 1971, pp. 510-517.

Kedem et al., "EDS—Sealed Cell Electrodialysis," *Desalination*, vol. 46, 1983, pp. 291-299.

Kedem et al., "Reduction of Polarization by Ion-Conduction Spacers: Theoretical Evaluation of a Model System," *Desalination*, vol. 27, 1978, pp. 143-156.

Korngold, "Electrodialysis Process Using Ion Exchange Resins Between Membranes," *Desalination*, vol. 16, 1975, pp. 225-233.

Laktionov, Evgueni Viktorovitch, "Déminéralisation De Solutions Électrolytiques Diluées. Analyse Comparative Des Performances De Differents Procédés D'Électrodialyse", Directeur de these, Université Montpellier II, Science Et Technique Du Languedoc, Jul. 17, 1998.

Matejka, "Continuous Production of High-Purity Water by Electro-Deionisation," *J. Appl. Chem., Biotechnol.*, vol. 21, Apr. 1971, pp. 117-120.

Pourcelly, Gerald, Conductivity and selectivity of ion exchange membranes: structure-correlations, *Desalination*, vol. 147 (2002) pp. 359-361.

Purolite Technical Bulletin, Hypersol-Macronet™ Sorbent Resins, 1995.

V. Shaposhnik et al., "Demineralization of water by electrodialysis with ion-exchange membranes, grains and nets," *Desalination*, vol. 133, (2001), pp. 211-214.

R. Simons, "Strong Electric Field Effects on Proton Transfer Between Membrane-Bound Amines and Water," *Nature*, vol. 280, Aug. 30, 1979, pp. 824-826.

R. Simons, "Electric Field Effects on Proton Transfer Between Ionizable Groups and Water in Ion Exchange Membranes," *Electrochimica Acta*, vol. 29, No. 2, 1984, pp. 151-158.

R. Simons, "Water Splitting In Ion Exchange Membranes," Pergamon Press Ltd., 1985, pp. 275-282.

R. Simons, "The Origin and Elimination of Water Splitting in Ion Exchange Membranes During Water Demineralisation By Electrodialysis," *Desalination*, vol. 28, Jan. 29, 1979, pp. 41-42.

USFilter, "H-Series Industrial CDI® Systems," product information, 1998, 4 pgs.

Walters et al., "Concentration of Radioactive Aqueous Wastes," *Industrial and Engineering Chemistry*, Jan. 1955, pp. 61-67.

Warshawsky et al., "Thermally Regenerable Polymerable Polymeric Crown Ethers, II Synthesis and Application in Electrodialysis," pp. 579-584, publication and date unknown.

\* cited by examiner

WATER TREATMENT SYSTEM AND METHOD

BACKGROUND OF THE INVENTION

1. Field of the Invention

The present invention relates generally to a system and method for treating a fluid and, more particularly, to a water treatment system incorporating an electrochemical device, a reservoir system and a reject flow regulator and methods thereof for delivering treated water to a point of use.

2. Description of Related Art

Water that contains hardness species such as calcium and magnesium may be undesirable for some uses in industrial, commercial and household applications. The typical guidelines for a classification of water hardness are: zero to 60 milligrams per liter (mg/l) as calcium carbonate is classified as soft; 61 to 120 mg/l as moderately hard; 121 to 180 mg/l as hard; and more than 180 mg/l as very hard.

Hard water can be softened or treated by removing the hardness ion species. Examples of systems that remove such species include those that use ion exchange beds. In such systems, the hardness ions become ionically bound to oppositely charged ionic species that are mixed on the surface of the ion exchange resin. The ion exchange resin eventually becomes saturated with ionically bound hardness ion species and must be regenerated. Regeneration typically involves replacing the bound hardness species with more soluble ionic species, such as sodium chloride. The hardness species bound on the ion exchange resin are replaced by the sodium ions and the ion exchange resins are ready again for a subsequent water softening step.

Other systems have been disclosed. For example, Dosch, in U.S. Pat. No. 3,148,687 teaches a washing machine including a water softening arrangement using ion exchange resins. Similarly, Gadini et al., in International Application Publication No. WO00/64325, disclose a household appliance using water with an improved device for reducing the water hardness. Gadini et al. teach of a household appliance having a control system, a water supply system from an external source and a softening system with an electrochemical cell.

Electrodeionization (EDI) is one process that may be used to soften water. EDI is a process that removes ionizable species from liquids using electrically active media and an electrical potential to influence ion transport. The electrically active media may function to alternately collect and discharge ionizable species, or to facilitate the transport of ions continuously by ionic or electronic substitution mechanisms. EDI devices can include media having permanent or temporary charge. Such devices can cause electrochemical reactions designed to achieve or enhance performance. These devices also include electrically active membranes such as semi-permeable ion exchange or bipolar membranes.

Continuous electrodeionization (CEDI) is a process wherein the primary sizing parameter is the transport through the media, not the ionic capacity of the media. A typical CEDI device includes semi-permeable anion and cation exchange membranes. The spaces between the membranes are configured to create liquid flow compartments with inlets and outlets. A transverse DC electrical field is imposed by an external power source using electrodes at the bounds of the membranes and compartments. Often, electrode compartments are provided so that reaction product from the electrodes can be separated from the other flow compartments. Upon imposition of the electric field, ions in the liquid are attracted to their respective counter-electrodes. An ion-depleting (depleting) compartment, bounded by the electroactive anion permeable membrane and cation membrane, typically become ionically depleted and an adjoining ion-concentrating (concentrating) compartments, bounded by the electroactive cation permeable membrane and the electroactive anion membrane, typically become ionically concentrated. The volume within the depleting compartments and, in some cases, within the concentrating compartments, also includes electrically active media. In CEDI devices, the media may include intimately mixed anion and cation exchange resins. The ion-exchange media typically enhances the transport of ions within the compartments and may participate as a substrate for controlled electrochemical reactions. Electrodeionization devices have been described by, for example, Giuffrida et al. in U.S. Pat. Nos. 4,632,745, 4,925,541 and 5,211,823, by Ganzi in U.S. Pat. Nos. 5,259,936 and 5,316,637, by Oren et al. in U.S. Pat. No. 5,154,809 and by Kedem in U.S. Pat. No. 5,240,579.

SUMMARY OF THE INVENTION

In one aspect, the present invention provides a method of treating water. The method can comprise introducing water into an electrochemical device to produce treated water and a concentrate stream, recirculating at least a portion of the concentrate stream in a concentrating compartment of the electrochemical device, and discharging a predetermined portion of the concentrate stream according to a predetermined discharge schedule.

In accordance with one or more embodiments, the present invention provides an electrochemical device comprising a concentrating compartment and a positively-charged flow regulator positioned downstream of the concentrating compartment.

In accordance with one or more embodiments, the present invention provides a method of facilitating water treatment. The method can comprise providing an electrochemical device comprising a concentrating compartment and a flow regulator positioned downstream of the concentrating compartment. The flow regulator constructed and arranged to have a positive charge during operation of the electrochemical device.

In accordance with one or more embodiments, the present invention provides a method of treating water. The method can comprise introducing water into an electrochemical device to produce treated water, storing at least a portion of the treated water, ceasing production of the treated water, and replacing any fluid in the electrochemical device with the treated water.

In accordance with one or more embodiments, the present invention provides a system comprising a point-of-entry, an electrochemical device comprising a depleting compartment and a concentrating compartment fluidly connected to the point-of-entry, a positively-charged flow regulator fluidly connected downstream of the concentrating compartment, a reservoir system fluidly connected to the depleting compartment, and a point of use fluidly connected to the reservoir system.

In accordance with one or more embodiments, the present invention provides an electrodeionization device comprising a concentrating compartment and a flow regulator regulated by a controller according to a predetermined discharge schedule and fluidly connected downstream of the concentrating compartment for regulating a flow of a waste stream to a drain.

In accordance with one or more embodiments, the present invention provides a method of softening water. The method can comprise introducing water to a depleting compartment of an electrochemical device to produce softened water, recirculating a concentrating stream in a concentrating compartment of the electrochemical device, and changing a pH of the concentrating stream proximate a flow regulator.

In accordance with one or more embodiments, the present invention provides an electrodeionization device comprising a concentrating compartment with a flowing waste stream and a diaphragm valve for regulating a portion of the flowing waste stream from the concentrating compartment to a drain.

In accordance with one or more embodiments, the present invention provides an electrodeionization device comprising a concentrating compartment with a flowing waste stream and means for discharging a portion of the waste stream from the concentrating compartment to a drain according to a predetermined schedule.

In accordance with one or more embodiments, the present invention provides an electrochemical device comprising a concentrating compartment with a waste system, means for discharging the waste stream to a drain, and means for applying a positive charge on the means for discharging the waste stream.

In accordance with one or more embodiments, the present invention provides a method of facilitating fluid treatment. The method can comprise providing a fluid treatment system comprising an electrochemical device comprising a depleting compartment and a flow regulator regulated by a controller according to a predetermined discharge schedule and fluidly connected downstream of the concentrating compartment for regulating a flow of a waste stream to a drain.

Other advantages, novel features and objects of the invention will become apparent from the following detailed description of the invention when considered in conjunction with the accompanying drawings, which are schematic and are not intended to be drawn to scale. In the figures, each identical or substantially similar component that is illustrated in various figures is represented by a single numeral or notation. For purposes of clarity, not every component is labeled in every figure, nor is every component of each embodiment of the invention shown where illustration is not necessary to allow those of ordinary skill in the art to understand the invention.

BRIEF DESCRIPTION OF THE DRAWINGS

Preferred, non-limiting embodiments of the present invention will be described by way of example and with reference to the accompanying drawings, in which:

FIGS. 6A-6B are graphs showing water properties measured in the water treatment system schematically shown in FIG. 5 under an applied potential of about 40 volts, wherein FIG. 6A shows the conductivity of product and tank outlet streams and FIG. 6B shows the conductivity of a reject stream;

FIGS. 7A-7B are graphs showing water properties measured in the water treatment system schematically shown in FIG. 5 under an applied potential of about 52 volts, wherein FIG. 7A shows the conductivity of product and tank outlet streams and FIG. 7B shows the conductivity of a reject stream; and FIGS. 8A-8B are graphs showing measured water properties of the water treatment system schematically shown in FIG. 5, wherein FIG. 8A shows the conductivity of product and tank outlet streams and FIG. 8B shows the conductivity of a reject stream.

DETAILED DESCRIPTION OF THE INVENTION

United States Patent Applications titled WATER TREATMENT SYSTEM AND METHOD by Wilkins et al. and filed on even date herewith; WATER TREATMENT SYSTEM AND METHOD by Jha et al. and filed on even date herewith; WATER TREATMENT SYSTEM AND METHOD by Ganzi et al. and filed on even date herewith; WATER TREATMENT SYSTEM AND METHOD by Freydina et al. and filed on even date herewith; WATER TREATMENT SYSTEM AND METHOD by Freydina et al. and filed on even date herewith; WATER TREATMENT SYSTEM AND METHOD by Wilkins et al. and filed on even date herewith; and WATER TREATMENT SYSTEM AND METHOD by Jha et al. and filed on even date herewith are hereby incorporated by reference herein.

The present invention is directed to a water treatment system and method for providing treated water in industrial, commercial and residential applications. The treatment system provides treated or softened water to a point of use by removing at least a portion of any hardness-causing species contained in water from a water source, such as municipal water, well water, brackish water and water containing foulants. Other applications of the system would be in the treatment and processing of foods and beverages, sugars, various industries, such as the chemical, pharmaceutical, food and beverage, wastewater treatments and power-generating industries.

The water treatment system typically receives water from the water source or a point-of-entry and treats the water containing at least some undesirable species before delivering the treated water to a point of use. A treatment system typically has a reservoir system in line with an electrodeionization device. The treatment system, in some embodiments, further comprises a sensor for measuring at least one property of the water or an operating condition of the treatment system. In other embodiments, the treatment system also includes a controller for adjusting or regulating at least one operating parameter of the treatment system or a component of the treatment system.

Figure 1:
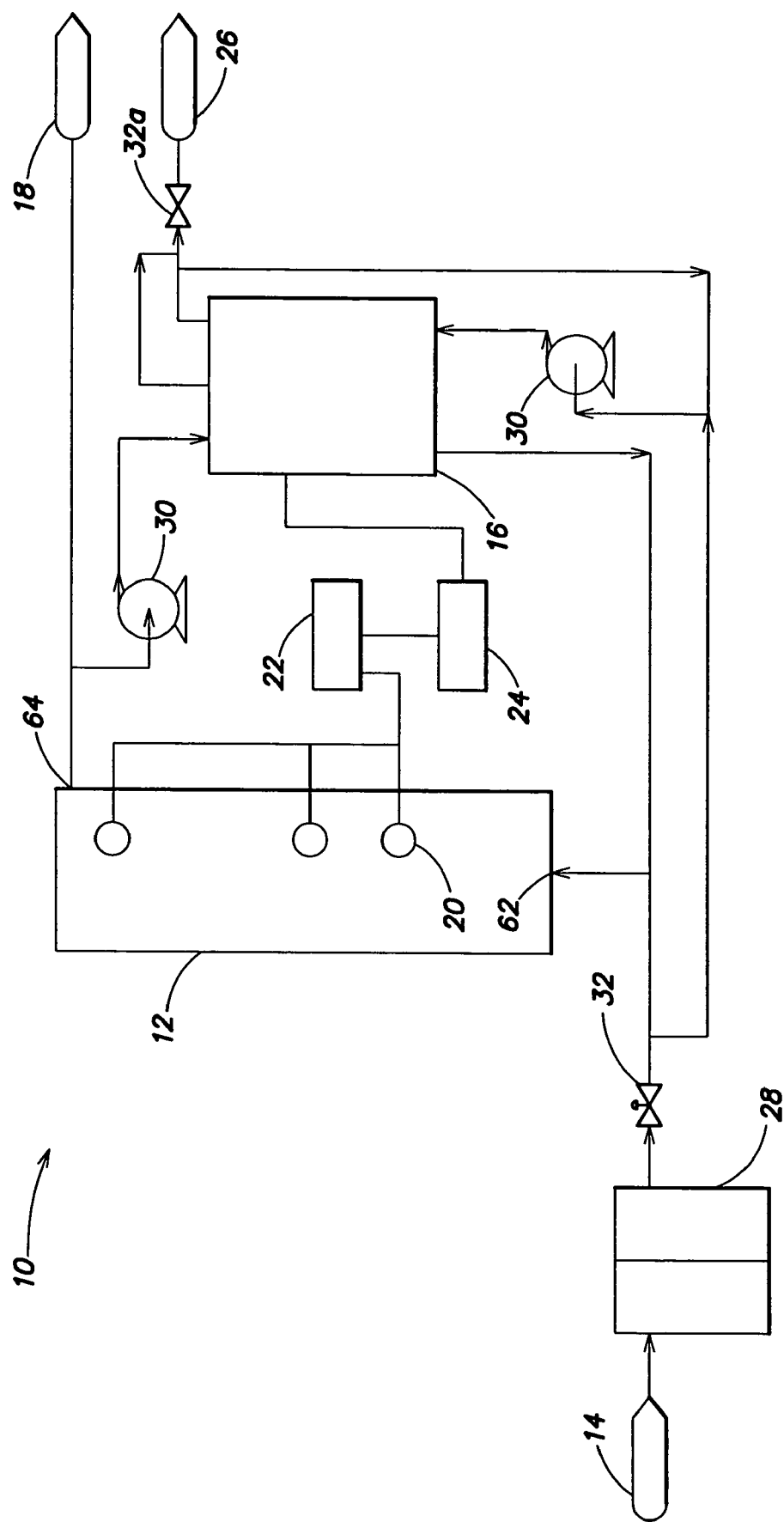
FIG. 1 is a process flow diagram of a water treatment system showing a reservoir system having a set of sensors and an electrodeionization device in accordance with one or more embodiments of the invention.

FIG. 1 shows a schematic flow diagram according to one embodiment of a water treatment system. The water treatment system 10 can include a reservoir system 12 fluidly connected, typically at an upstream end, to a water source or a point-of-entry 14 and also to an electrodeionization device 16, typically at a downstream end. Water treatment system 10 typically includes a point of use 18, which is typically fluidly connected downstream of reservoir system 12. In certain embodiments of the present invention, water treatment system 10 also has a sensor 20 and a controller 22 for controlling or regulating power source 24 which provides power to electrodeionization device 16. Electrodeionization device 16 typically removes undesirable species from water to be treated flowing from point-of-entry 14 to produce treated water for storage into reservoir system 12 and ultimate delivery to point of use 18. Undesirable species removed by electrodeionization device 16 is typically transferred to an auxiliary use or a drain 26.

Water treatment system 10, in certain embodiments of the invention, further includes pretreatment system 28, which is typically fluidly connected upstream of reservoir system 12 or electrodeionization device 16. Moreover, water treatment system 10 typically also includes fluid control components, such as pump 30 and valve 32.

The present invention will be further understood in light of the following definitions. As used herein, "pressurized" refers to a system or component that has a pressure, internal or applied, that is above atmospheric pressure. For example, a pressurized reservoir system has an internal pressure that is greater than atmospheric pressure. For illustrative purposes, the present invention has been described in terms of an electrodeionization device. However, the systems and techniques of the present invention may utilize other electrochemical devices that effect removal or reduction of an undesirable species from a fluid stream to be treated. For example, the electrochemical device can comprise an electrodialysis apparatus or, in some embodiments of the invention, a capacitive deionization apparatus.

Figure 2:
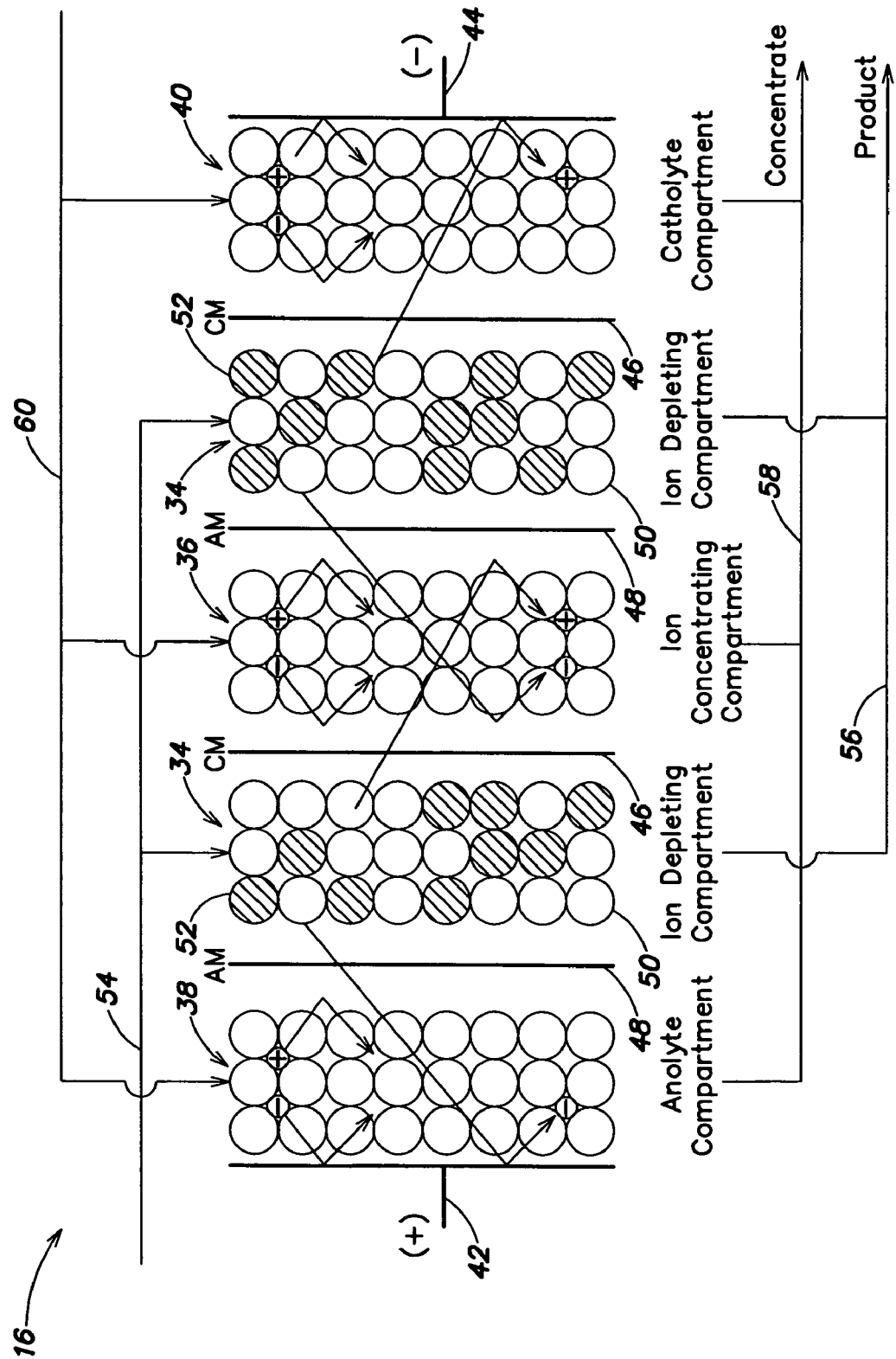
FIG. 2 is a schematic, sectional view through a typical electrodeionization device, illustrating the fluid and ion flow directions through depleting and concentrating compartments in accordance with one or more embodiments of the invention.

FIG. 2 schematically shows a cross-sectional view of fluid and ion flow paths through one embodiment of an electrodeionization device of the present invention. The electrodeionization device or device 16 includes ion-depleting or depleting compartments 34 and ion-concentrating or concentrating compartments 36, positioned between depleting compartments 34. Depleting compartments 34 are typically bordered by an anolyte compartment 38 and a catholyte compartment 40. Typically, end blocks (not shown) are positioned adjacent to end plates (not shown) to house an anode 42 and a cathode 44 in their respective compartments. In certain embodiments of the present invention, the compartments include cation-selective membranes 46 and anion-selective membranes 48, which are typically peripherally sealed to the periphery of both sides of the compartments.

The cation-selective membranes and anion-selective membranes are typically comprised of an ion exchange powder, a polyethylene powder binder and a glycerin lubricant. In some embodiments of the present invention, the cation- and anion-selective membranes are heterogeneous polyolefin-based membranes, which are typically extruded by a thermoplastic process using heat and pressure to create a composite sheet. However, the use of homogeneous membranes alone or in combination with heterogeneous membranes is contemplated by the present invention. Representative suitable ion-selective membranes include, for example, web supported using styrene-divinyl benzene with sulphonic acid or quaternary ammonium functional groups, web supported using styrene-divinyl benzene in a polyvinylidene fluoride binder, and unsupported-sulfonated styrene and quarternized vinyl benzyl amine grafts on polyethylene sheet.

Concentrating compartments 36 are typically filled with cation exchange resin 50 and depleting compartments 34 are typically filled with cation exchange resin 50 and anion exchange resin 52. In some embodiments of the invention, the cation exchange and anion exchange resins can be arranged in layers within any of the depleting, concentrating and electrode compartments so that a number of layers in a variety of arrangements can be assembled. Other embodiments are believed to be within the scope of the invention including, for example, the use of mixed bed ion exchange resins in any of the depleting, concentrating and electrode compartments, the use of inert resin between layer beds of anionic and cationic exchange resins, the use of various types and arrangements of anionic and cationic resins including, but not limited to, those described by DiMascio et al., in U.S. Pat. No. 5,858,191, which is incorporated herein by reference in its entirety.

In operation, a liquid to be treated 54, typically from an upstream water source entering the treatment system at point-of-entry 14, having dissolved cationic and anionic components, including hardness ion species, is introduced into depleting compartments 34 through a manifold 60, wherein the cationic components are attracted to the cation exchange resin 50 and the anionic components are attracted to the anion exchange resin 52. An electric field applied across electrodeionization device 16, through anode 42 and cathode 44, which are typically positioned on opposite ends of electrodeionization device 16, typically passes perpendicularly relative to the fluid flow direction such that cationic and anionic components in the liquid tend to migrate in a direction corresponding to their attracting electrodes.

Cationic components can migrate through cation-selective membrane 46 into adjacent concentrating compartment 36. Anion-selective membrane 48, positioned on the opposite side of concentrating compartment 36, can prevent migration into adjacent compartments, thereby trapping the cationic components in the concentrating compartment. Similarly, anionic components can migrate through the ion-selective membranes, but in a direction that is typically opposite relative to the migration direction of the cationic components. Anionic components can migrate through anion-selective membrane 48, from depleting compartment 34, into adjacent concentrating compartment 36. Cation-selective membrane 46, positioned on the other side of concentrating compartment 36, can prevent further migration, thus trapping anionic components in the concentrating compartment. In net effect, ionic components are removed or depleted from the liquid 54 in depleting compartments 34 and collected in concentrating compartments 36 resulting in a treated water product stream 56 and a concentrate or waste stream 58.

In some embodiments of the present invention, the applied electric field across electrodeionization device 16 can create a polarization phenomenon, which leads to the dissociation of water into hydrogen and hydroxyl ions. The hydrogen and hydroxyl ions can regenerate the ion exchange resins 50 and 52 in depleting compartments 34, so that removal of dissolved ionic components can occur continuously and without a separate step for regenerating exhausted ion exchange resins because of the ionic species migration. The applied electric field across electrodeionization device 16 is typically a direct current. However, any applied electric field that creates a bias or a potential difference between one electrode and another can be used to promote migration of ionic species. Therefore, an alternating current may be used, provided that there is a potential difference between electrodes that is sufficient to attract cationic and anionic species to the respective attracting electrodes. In yet another embodiment of the invention, an alternating current may be rectified, for example, by using a diode or a bridge rectifier, to convert an alternating current to a pulsating direct current such that, when the current is applied across the electrodeionization device, a potential gradient is created that attracts the respective ionic species.

The electroactive media, for example, the ion exchange resin beads 50 and 52, typically utilized in depleting compartments 34, can have a variety of functional groups on their surface regions, such as tertiary, alkyl amino groups and dimethyl ethanolamine. These materials can also be used in combinations with ion exchange resin materials having various functional groups on their surface regions, such as quaternary ammonium groups.

Reservoir system 12 can store or accumulate water from point-of-entry 14 or a water source and may also serve to store softened or treated water from product stream 56 from electrodeionization device 16 and also provide water, typically treated water or treated water mixed with water from point-of-entry 14 to point of use 18 through a distribution system. In one embodiment of the present invention, reservoir system 12 is a pressurized reservoir system. Pressure in the pressurized reservoir system can be created by various methods and techniques, for example, by pressurizing the water with a pump or by elevating the water source, thus creating head pressure.

In some embodiments of the present invention, reservoir system 12 comprises a pressurized vessel or a vessel that has inlets and outlets for fluid flow such as an inlet 62 and an outlet 64. Inlet 62 is typically fluidly connected to point-of-entry 14 and outlet 64 is typically fluidly connected to a water distribution system or to point of use 18. Reservoir system 12 can have several vessels or vessels having several inlets positioned at various locations on each vessel. Similarly, outlet 64 may be positioned on each vessel at various locations depending on, among other things, demand or flow rate to point of use 18, capacity or efficiency of electrodeionization device 16 and capacity or hold-up of reservoir system 12. Reservoir system 12 may further comprise various components or elements that perform desirable functions or avoid undesirable consequences. For example, reservoir system 12 can have vessels having internal components, such as baffles that are positioned to disrupt any internal flow currents within the vessels of reservoir system 12. In some embodiments of the invention, reservoir system 12 has a heat exchanger for heating or cooling the fluid. For example, reservoir system 12 may comprise a vessel with a heating coil, which can have a heating fluid at an elevated temperature. The heating fluid may be hot water in closed-loop flow with a heating unit operation such as a furnace so that when the heating fluid temperature is raised in the furnace, the temperature of the water in the vessel increases through heat transfer. Other examples of auxiliary or additional components include, but are not limited to, pressure relief valves designed to relieve internal pressure of any vessels and avoid or at least reduce the likelihood of vessel rupture and thermal expansion tanks that are suitable for maintaining a desired operating pressure. The size and capacity of a thermal expansion tank will depend on factors including, but not limited to, the total volume of water, the operating temperature and pressure of the reservoir system.

In operation, reservoir system 12 is typically connected downstream of point-of-entry 14 and fluidly connected in-line, such as in a recirculation loop, with electrodeionization device 16. For example, water from point-of-entry 14 can flow into inlet 62 and can mix with the bulk water contained within reservoir system 12. Water can exit reservoir system 12, typically through outlet 64, and directed to point of use 18 or through pump 30 into electrodeionization device 16 for treatment or removal of any undesirable species. Treated water leaving electrodeionization device 16 may mix with water from point-of-entry 14 and enter reservoir system 12 through inlet 62. In this way, a loop can be defined or formed between reservoir system 12 and electrodeionization device 16 and feedwater from point-of-entry 14 can replenish water demand created by and flowing to point of use 18.

Point-of-entry 14 can provide water from a water source or connects the water source to the water treatment system. The water source may be a potable water source, such as municipal water or well water or it may be a non-potable, such as a brackish or salt-water source. Typically, an intermediate treatment or treatment system treats the water so that is suitable for human consumption before reaching point-of-entry 14. The water typically contains dissolved salts or ionic or ionizable species including sodium, chloride, calcium ions, magnesium ions, carbonates, sulfates or other insoluble or semi-soluble species or dissolved gases, such as silica and carbon dioxide. Moreover, the water may contain additives, such as but not limited to fluoride, chlorate and bromate.

In another embodiment of the present invention, water treatment system 10 includes to a water distribution system, which in turn connects to a point of use. The water distribution system may comprise components that are fluidly connected to provide pressurized water, typically treated water, from reservoir system 12 to point of use 18. The water distribution system may comprise an arrangement of pipes, valves, tees, pumps and manifolds to provide water from reservoir system 12 to one or several points of use 18 or to any component of water treatment system 10.

Point-of-use 18 is typically any device or appliance that requires or demands water. For example, point of use 18 may be an appliance, such as a washing machine or a dishwasher, or may be a faucet serving to provide water to a kitchen sink or a showerhead. In another embodiment of the invention, point of use 18 comprises a system for providing water suitable for household or residential use. In still another embodiment of the invention, water treatment system 10 also comprises a sensor, typically a water property sensor, which measures at least one physical property of the water in water treatment system 10. For example, sensor 20 may be a device that can measure turbidity, alkalinity, water conductivity, pH, temperature, pressure or flow rate. Sensor 20 may be installed or positioned within water treatment system 10 to measure a particularly preferred water property. For example, sensor 20 may be a water conductivity sensor installed in reservoir system 12 so that sensor 20 measures the conductivity of the water, which indirectly measures the quality of the water available for service in point of use 18. In another embodiment of the invention, sensor 20 may comprise a series or a set of sensors in reservoir system 12. The set of sensors may be arranged and connected to controller 22 so that the quality of water in reservoir system 12 is monitored, intermittently or continuously through controller 22, and the quality of water or the operation of electrodeionization device 16 can be optimized as described below. Other embodiments may comprise a combination of sets of sensors in various locations throughout water treatment system 10. For example, sensor 20 may be a flow sensor measuring a flow rate to a point of use 18 and further include any of a nephelometer, pH, temperature and pressure sensor monitoring the operating condition of water treatment system 10.

In accordance with another embodiment of the present invention, water treatment system 10 further comprises a pretreatment system 28 designed to remove a portion of any undesirable species from the water before the water is introduced to, for example, reservoir system 12 or electrodeionization device 16. Examples of pretreatment systems include, but are not limited to, reverse osmosis devices, which are typically used to desalinate brackish or salt water. Carbon or charcoal filters, as components of pretreatment systems, may be necessary to remove at least a portion of any chlorine, including active chlorine or any species that may foul or interfere with the operation of electrodeionization device 16.

Pretreatment system 28 may be positioned anywhere within water treatment system 10. For example, pretreatment system 28 may be positioned upstream of reservoir system 12 or downstream of pressurized system 12 but upstream of electrodeionization device 16 so that at least some chlorine species are retained in reservoir system 12 but are removed before the water enters electrodeionization device 16.

In accordance with one or more embodiments of the present invention, water treatment system 10 further comprises a controller 22 that is capable of monitoring and regulating the operating conditions of water treatment system 10 and its components. Controller 22 typically comprises a microprocessor-based device, such as a programmable logic controller (PLC) or a distributed control system that receives or sends input and output signals to components of water treatment system 10. For example, controller 22 may be a PLC that can send a signal to power source 24, which can supply power to electrodeionization device 16 or may provide a signal to a motor control center that provides power to pumps 30. In certain embodiments, controller 22 can regulate the operating conditions of water treatment system 10 in open-loop or closed-loop control scheme. For example, controller 22, in open-loop control, may provide signals to the water treatment system such that water is treated without measuring any operating condition. In contrast, controller 22 may control the operating conditions in closed-loop control so that operating parameters may be adjusted depending on a measured operating condition. In yet another embodiment of the invention, controller 22 may further comprise a communication system such as a remote communication device for transmitting or sending any of measured operating condition or operating parameter to a remote station.

In accordance with another embodiment of the present invention, controller 22 may provide a signal that actuates any valves 32 in water treatment system 10 so that fluid flow parameters in water treatment system 10 can be adjusted or adjustable based on a variety of operating parameters including, but not limited to, the quality of water from point-of-entry 14, the quality of water to point of use 18, the demand or quantity of water to point of use 18, the operating efficiency or capacity of electrodeionization device 16, or any of a variety of operating conditions, such as the water conductivity, pH, temperature, pressure, composition and flow rate. In accordance with one embodiment of the invention, controller 22 can receive signals from sensor 20 so that controller 22 can be capable of monitoring the operating parameters of water treatment system 10. For example, sensor 20 may be a water conductivity sensor positioned within reservoir system 12 so that the water conductivity in reservoir system 12 is monitored by controller 22. Controller 22 can, based on the water quality measured by sensor 20, control power source 24, which provides an electric field to electrodeionization device 16. In operation, controller 22 can increase, decrease or otherwise adjust the voltage, current, or both, supplied to electrodeionization device 16.

In accordance with another embodiment of the present invention, controller 22 may reverse the direction of the applied field from power source 24 to electrodeionization device 16 according to a predetermined schedule or according to an operating condition, such as the water quality or any other operating parameter. Polarity reversal, which has been described by, for example, Giuffrida et al., in U.S. Pat. No. 4,956,071, and which is incorporated herein by reference in its entirety, is considered to be within the scope of the present invention.

Controller 22 may be configured or configurable by programming or may be self-adjusting such that it is capable of maximizing any of the service life and the efficiency of or reducing the operating cost of treatment system 10. For example, controller 22 may comprise a microprocessor having user-selectable set points or self-adjusting set points that adjusts the applied voltage and current to electrodeionization device 16, the flow rate through the concentrating and depleting compartments of the electrodeionization device or the flow rate to discharge to drain 26 from the electrodeionization device or the pretreatment system or both. In another embodiment of the invention, controller 22 may be programmed to be capable of adjusting a change in cycle of electrodeionization device. For example, controller 22 may control the period between plurality reversal of an applied electric field across the electrodeionization device based on a measured water property such as, but not limited to, the conductivity of the water being delivered to the point of use. In another embodiment of the invention, controller 22 can calculate a Langelier Saturation Index (LSI) of the water in reservoir system 12 and adjust an operating parameter of the system 10 based on the difference between the calculated LSI and a set point. LSI can be calculated according to, for example, the procedure described in ASTM D 3739. In some embodiments of the invention, the treated fluid, such as the softened water, has a low LSI so that it has a low tendency to scale. As used herein, low LSI water has a LSI of about less than 2, preferably, less than about 1, and more preferably, less than about zero. In some embodiments, the present invention provides treated liquids, such as water, having a low conductivity. As used herein, a low conductivity liquid has a conductivity of less than about 300 µS/cm, preferably less than about 220 µS/cm and more preferably, less than about 200 µS/cm.

Controller 22 can incorporate dead band control to reduce the likelihood of unstable on/off control or chattering. Dead band refers to the range of signal outputs that a sensor provides without necessarily triggering a responsive control signal. The dead band may reside, in some embodiments, intrinsically in one or more components of the treatment system, such as the sensor, or may be programmed as part of the control system, or both. Dead band control can avoid unnecessary intermittent operation by smoothing out measurement excursions. Such control techniques can prolong the operating life or mean time before failure of the components of treatment system 10. Other techniques that can be used include the use of voting, time-smoothing or time-averaging measurements or combinations thereof.

Accordingly, in accordance with one or more embodiments of the present invention, the treatment system stores water from point-of-entry 14, which is typically connected to a water source, at a pressure above atmospheric pressure in a first zone of reservoir system 12. Reservoir system 12 can be fluidly connected to a water distribution system that transfers treated water to point of use 18. Treatment system 18 can also have an electrodeionization device 16 that treats water from point-of-entry 14 by removing at least a portion of any undesirable species to produce treated water that is introduced into reservoir system 12 in a second zone of reservoir system 12. First and second zones of reservoir system 12 can be monitored by at least one water quality sensor, more preferably, a set of water quality sensors connected to controller 22, which, in turn, can adjust an operating parameter of electrodeionization device 16. In this way, controller 22 can monitor the first and second zones of reservoir system 12 and regulate the operation of electrodeionization device 16 depending on any of the properties measured by a sensor or a set of sensors 20 which measures the water properties of the water in the first and second zones.

In yet another embodiment of the present invention, controller 22, through sensor or set of sensors 20, can measure a water property of the water in the first and second zones of reservoir system 12 and can also measure a flow rate flowing into at least one point of use 18 and can adjust an operating parameter of electrodeionization device 16 based on the measured properties. For example, when an increased flow rate is measured to point of use 18, controller 22 adjusts an operating parameter of electrodeionization device 16 to treat water to compensate for additional demand flowing into point of use 18. In another example, controller 22 can adjust an operating parameter of electrodeionization device 16 depending on the volume in the first and second zones of reservoir system 12 and the historical demand required by point of use 18.

In accordance with another embodiment of the present invention, controller 22 regulates the operation of the treatment system by incorporating adaptive or predictive algorithms, which are capable of monitoring demand and water quality and adjusting the operation of the electrodeionization device, such as increasing or decreasing the applied voltage or the period between electric field reversals of electrodeionization device 16. For example, controller 22 may utilize predictive techniques in anticipating higher demand for treated water during early morning hours in a residential application to supply point of use 18 serving as a showerhead.

In another embodiment of the present invention, treatment system 10 comprises a flow regulator 32a for regulating the flow of a discharge or waste stream to drain 26. Flow regulator 32a can adjust the amount or volume of the waste stream that flows to drain 26. In another aspect of the embodiment, flow regulator 32a is capable of creating a pulsating flow to drain 26 and can comprise any of a valve or an orifice plate or a combination thereof. In another embodiment of the invention, because flow regulator 32a is typically fluidly disposed downstream in the treatment system, the pulsating flow can create a pressure wave or front that can propagate throughout or a portion of the treatment system 10. In another aspect of one embodiment, the pressure wave is sufficient to dislodge any solids, precipitated material or gases trapped or accumulated in treatment system 10 so that the material or gas can be carried through and discharged to drain 26 or released through a vent (not shown) of treatment system 10.

According to another embodiment of the present invention, the flow regulator is a valve that can be intermittently opened and closed according to a predetermined schedule for a predetermined period of time to allow a predetermined volume to flow. The amount or volume of fluid flowing to drain can be adjusted or changed by, for example, changing the frequency the flow regulator is opened and closed or by changing the duration during which the flow regulator is open or closed. In one embodiment, the flow regulator can be controlled or regulated by controller 22 through, for example, an actuation signal. Thus, in one embodiment of the invention, controller 22 provides an actuation signal, such as a radio, current or a pneumatic signal, to an actuator, with, for example, a motor or diaphragm, that opens and closes the flow regulator.

Figure 3:
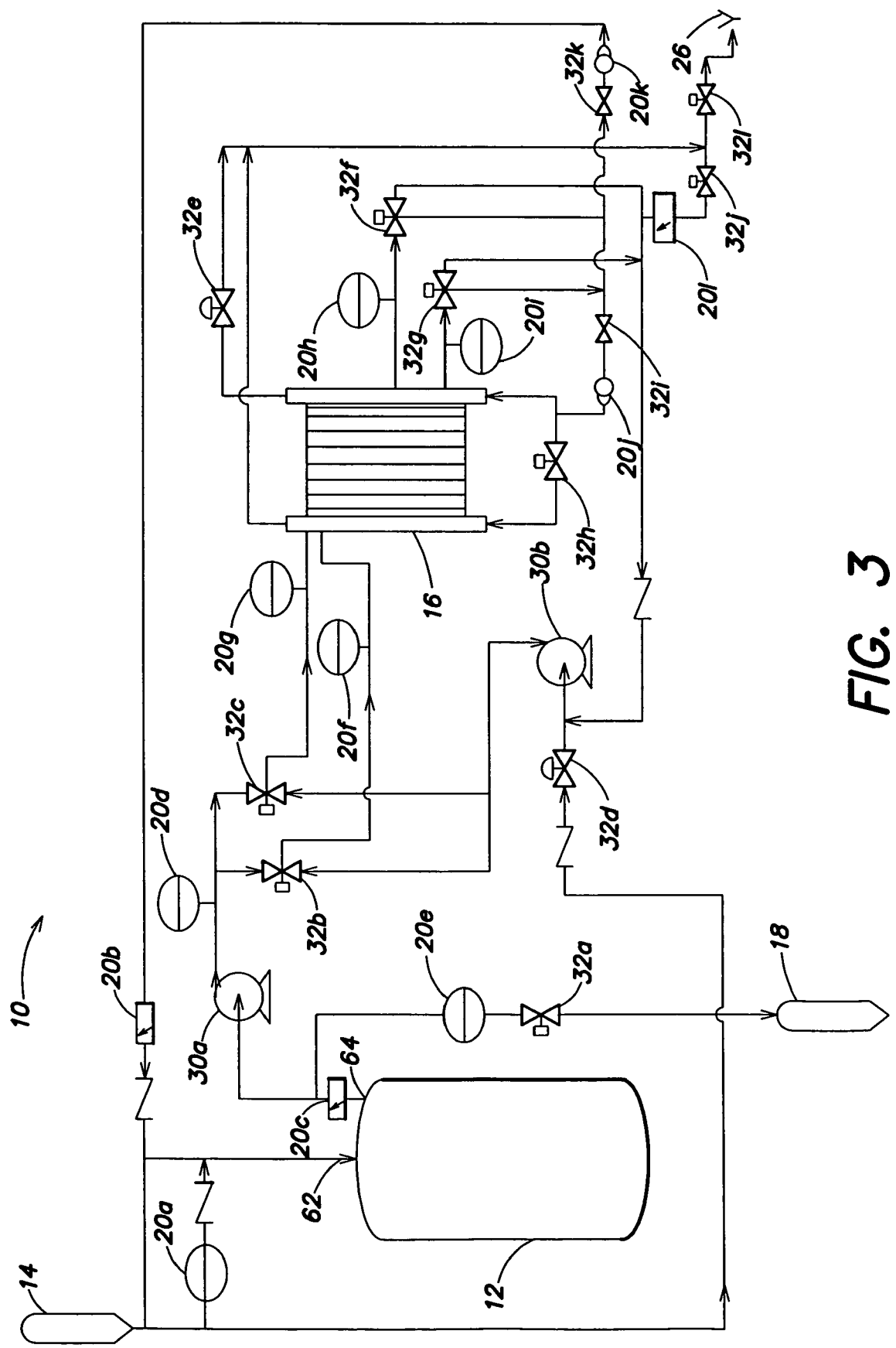
FIG. 3 is a schematic flow diagram of a water treatment system according to one embodiment of the invention as discussed in Example 1.

The fluid regulated by valve or flow regulator 32a can be any fluid in any stream to be discharged to waste such as waste stream 58 or a waste stream from a pretreatment device. Thus, in one embodiment, if the treatment system comprises a pretreatment system with a reverse osmosis apparatus, then the waste stream can include the discharge fluid from the electrodeionization device and the discharge fluid from the reverse osmosis apparatus. In yet another aspect of the present invention, with reference to FIG. 2, waste stream 58 can include any of the fluid from electrode compartments 38 and 40 or concentrating compartment 36 of the electrodeionization device. It can be seen that the fluid from electrode compartments or the concentrating compartments may be directly sent to drain 26 or may be recirculated, before discharge, to the electrode compartments, the concentrating compartment or both. In this way, the overall efficiency of the treatment system can be increased while decreasing operating costs because of less total discharge. In yet another embodiment, the present invention provides for adjusting an operating parameter, for example, the rate of discharge to drain or the period during discharge, as a function of at least one measured parameter such as the system operating pressure. For example, the period during which valve 321, in FIG. 3, is actuated open to discharge can be adjusted based on the measured pressure of the liquid supplied to point of use 18. In some cases, the flow regulator may be actuated open to reduce the measured pressure or it may be actuated to a minimum, depending on the type of valve, when the measured pressure is below a predetermined value. Such a secondary control scheme can be incorporated or nested within any of the existing control loops actuating the flow regulator.

In accordance with one or more embodiments of the present invention, the flow regulator comprises a valve that is a fast-opening valve with minimal or no pressure drop therethrough. Examples of suitable valves include, but are limited to, diaphragm valves as well as ball, gate and butterfly valves, which are available from, for example, Bürkert USA (Irvine, Calif.) and South Bend Controls, Inc. (South Bend, Ind.). Other valves that can be used include pinch or flex valves or any valve that can shed or dislodge any precipitated scales during activation.

In another embodiment of the present invention, the flow regulator can serve as part of a pressure control loop as well as in part of a concentrate discharge control loop. For example, the flow regulator can be actuated by controller 22 when the measured conductivity of the concentrate stream reaches the set point. A separate pressure control loop can be juxtaposed to relieve pressure in system 10. In any of the above-mentioned control schemes, the control loops can incorporate feedback as well as any of proportional, derivative, integral or, preferably, a combination thereof.

In another embodiment, the flow regulator can have an applied electrical charge flowing therethrough. The applied charge is, in one embodiment, a voltage or a current that is sufficient to generate ionic species around the flow regulator. And, in a preferred embodiment, the applied charge is sufficient to generate positively-charged ionic species. In yet another embodiment, the applied charge creates ionic species that lowers the pH of the fluid surrounding the flow regulator. Thus, in one aspect of one embodiment, the applied charge is sufficient to generate positively-charged hydrogen ions. Preferably, the applied charge generates sufficient hydrogen ions that, in effect, changes the pH to less than about 7, preferably, to less than about 6, and more preferably, to less than about 5. Thus, according another aspect of one embodiment of the present invention, the flow regulator is any of a valve or a plate with a flow orifice or a combination thereof that can have an applied charge that generates sufficient ionic species to reduce the pH of the surrounding fluid. The flow regulator can be made from any suitable material that can tolerate prolonged water exposure. Examples of such materials include, but are not limited to, stainless steels, plastics, conductive composites like graphite.

In yet another aspect of one embodiment of the present invention, the charge is applied periodically or applied depending an operating condition of the treatment system. For example, the charge can be applied charge can be applied according to a predetermined periodic schedule or, the applied charge can be applied when an operating parameter, such as any of the water conductivity, the pressure drop across the electrodeionization device, the water pH, the change voltage or current on the electrodeionization device or any combination thereof.

In another embodiment of the present invention, water, typical from waste stream 58, to auxiliary use can serve or provide additional or secondary benefits. For example, waste stream 58, rather than going to drain 26, may be used to provide irrigating water to any residential, commercial or industrial use, such as for irrigating, for recycling or for recovery of collected or concentrated salts.

The present invention will be further illustrated through the following examples, which are illustrative in nature and is not intended to limit the scope of the invention.

EXAMPLE 1

A treatment system, schematically shown in FIG. 3, was designed and evaluated for performance. The treatment system 10 had an electrodeionization device 16 with a pretreatment system (not shown) and a pressurized vessel 12. Water, from point-of-entry 14, was introduced into pressurized vessel 12 and was re-circulated through electrodeionization device 16. The water treatment system was controlled by a programmable controller (not shown) based on the measured water conductivity, as measured by sensors 20b and 20c, upstream of an inlet 62 and downstream of an outlet 64 of pressurized vessel 12.

Electrodeionization device 16 comprised a 10-cell pair stack with 13-inch flowpaths. Each cell was filled with AMBERLITE® SF 120 resin and AMBERLITE® IRA 458 resin, both available from Rohm & Haas Company, Philadelphia, Pa. The electrodeionization device utilized an expanded titanium electrode coated with ruthenium oxide.

Pressurized vessel 12 was a 10-inch diameter fiberglass vessel with about a 17-gallon capacity. The concentrate stream leaving the electrodeionization device was partially re-circulated and partially rejected to a drain 26 by regulating valves 32b, 32c, 32e, 32f, 32g, 32h, 32j and 32l. Make-up water, from point-of-entry 14, was fed into the recirculating stream to compensate for water rejected to drain 26 by regulating valves 32b, 32c and 32d in proper sequence.

The treated water exiting electrodeionization device 16 was transferred to vessel 12 by actuating valves 32i and 32k. The flow rate of treated water to a point of use 18 from outlet 64 of pressurized vessel 12 was regulated by adjusting valve 32a. Several sensors measuring operating conditions and water properties were installed throughout the water treatment system 10 including pressure indicators 20d, 20f, 20g, 20h and 20i, flow rate indicators 20a, 20e, 20j and 20k and conductivity sensors 20b, 20c and 20l.

The controller comprised a MicroLogix™ 1000 programmable controller, available from Allen-Bradley Company, Inc., Milwaukee, Wis. The electrodeionization device was set to start up by a flow switch signal or when the water conductivity of the outlet stream leaving the pressurized vessel was detected to be higher than a set point. The feed to the electrodeionization device was circulated from the pressurized vessel via a second feed pump. The polarity of the electric field applied to the electrodeionization device was reversed as necessary.

Valves 32j and 32l was an "on-off" type valve that provided a fully open or a fully closed flow path to drain 26. Valves 32j and 32l comprised of a needle valve or a ball valve. Valves 32j and 32l was actuated by a controller (not shown) and opened and closed according to a predetermined schedule. In addition, valves 32j and 32l had an applied positive charge that was sufficient to produce hydrogen ions to lower the pH of the surrounding fluid.

EXAMPLE 2

Figure 4:
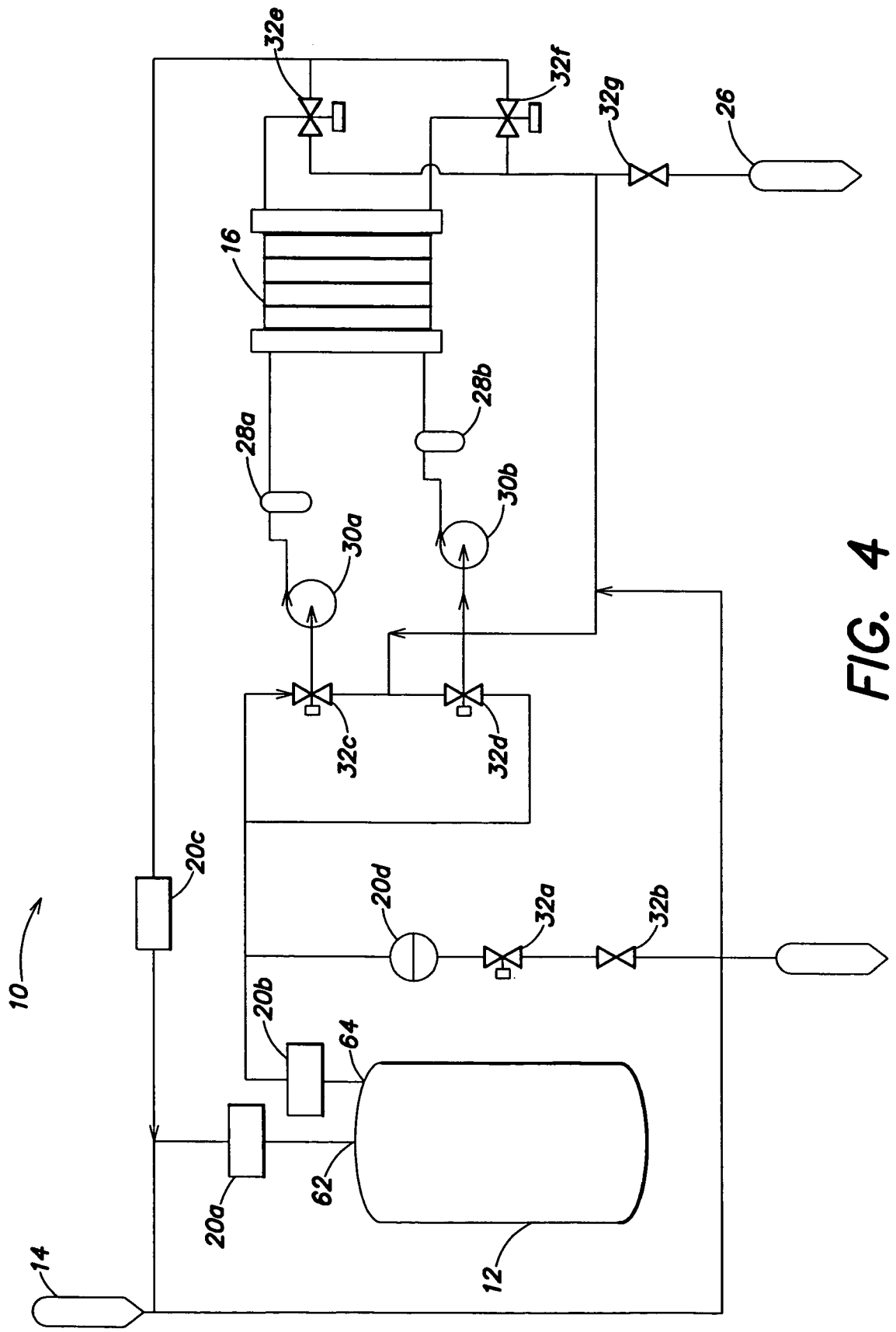
FIG. 4 is a schematic flow diagram of a water treatment system according to one embodiment of the invention as discussed in Example 2.

An in-line water treatment system, schematically shown in FIG. 4, was designed, operated and evaluated for performance. The water treatment system 10 had an electrodeionization device 16 and a pressurized storage vessel 12. Water, from point-of-entry 14, was introduced into pressurized storage vessel 12 through inlet 62 and was circulated using pumps 30a and 30b and treated through pretreatment units 28a and 28b and electrodeionization device 16. The water treatment system was controlled by a programmable controller (not shown) based on the measured water conductivity, as measured by sensors any of 20a, 20b and 20c.

Electrodeionization device 16 was comprised of a 10-cell pair stack with flowpaths that were about 7.5-inches long and about 2.5-inches wide. Each cell was filled with about 40% AMBERLITE® SF 120 resin and about 60% AMBERLITE® IRA 458 resin, both available from Rohm & Haas Company, Philadelphia, Pa. The electrodeionization device had an expanded titanium electrode coated with ruthenium oxide.

The controller was a MICROLOGIX™ 1000 programmable controller available from Allen-Bradley Company, Inc., Milwaukee, Wis. The electrodeionization device was set to start up by a flow switch signal or when the water conductivity of the outlet stream leaving the pressurized vessel was higher than a set point. The electrodeionization device operated until the conductivity reached the set point. The feed from the electrodeionization device was circulated from the pressurized vessel via a second feed pump. The polarity of the electric field applied to the electrodeionization device was reversed about every 15 minutes. In addition to controlling the components of electrodeionization device 16, the PLC collected, stored and transmitted measured data from sensors 20a, 20b, 20c and 20d.

Pressurized vessel 12 was a 10-inch diameter fiberglass vessel with about a 30-gallon capacity. Pressurized vessel 12 was fitted with a valve head and a center manifold pipe. The concentrate stream leaving the electrodeionization device was partially circulated and partially rejected to a drain 26 by regulating valves 32c, 32d, 32e, 32f and 32g. Make-up water, from point-of-entry 14, was fed into the circulating stream to compensate for any water that was rejected to drain 26.

The pretreatment system comprised of an aeration iron-filter with a 25-micron rating, a 20-inch×4-inch sediment filter and a 20-inch×4-inch carbon block filter.

In the one flow direction, water from pressure vessel 12 was pumped by pump 30a, from pressure vessel 12 through valve 32c, to pretreatment unit 28a before being introduced to the depleting compartments (not shown) of electrodeionization device 16. Treated water from electrodeionization device 16 was directed by valve 32f to storage in pressure vessel 12. Fluid collecting removed ionic species was circulated by pump 30b through pretreatment unit 28b, the concentrating and electrode compartments (not shown) of electrodeionization device 16 and valve 32e. When the direction of the applied electric field was reversed, the flow directions were correspondingly adjusted so that pump 30a, pretreatment unit 28a, and valves 32c and 32f circulated the fluid, which was accumulating ionic species, while flowing through the concentrating and electrode compartments of electrodeionization device 16. Similarly, water to be treated was pumped from pressure vessel 12 using pump 30b through valve 32d to pretreatment unit 28b before being introduced and treated in the depleting compartments of electrodeionization device 16. Treated water was directed by valve 32e to pressure vessel 12.

The flow rate of treated water, as measured by flow indicator 20d, to a point of use 18 from outlet 64 of pressurized vessel 12 was regulated by adjusting valves 32a and 32b. To discharge concentrate or waste stream, valve 32g was operated as necessary. Water from point-of-entry 14 was used to restore and replace fluid that was discharged to drain 26. Valve 32g was a diaphragm valve.

The water treatment system was operated until a target set point of about 220 µS/cm was reached and stable for about one minute. The applied voltage to the electrodeionization device was about 46 volts. The flow rates into the depleting and concentrating compartments were maintained at about 4.4 liters per minute. The reject flow rate was controlled to discharge about 270 ml every about 30 seconds. The pressure in the vessel was about 15 psig to about 20 psig. Discharge valve 32g was disassembled after the run and was found to have minimal scaling.

EXAMPLE 3

Figure 5:
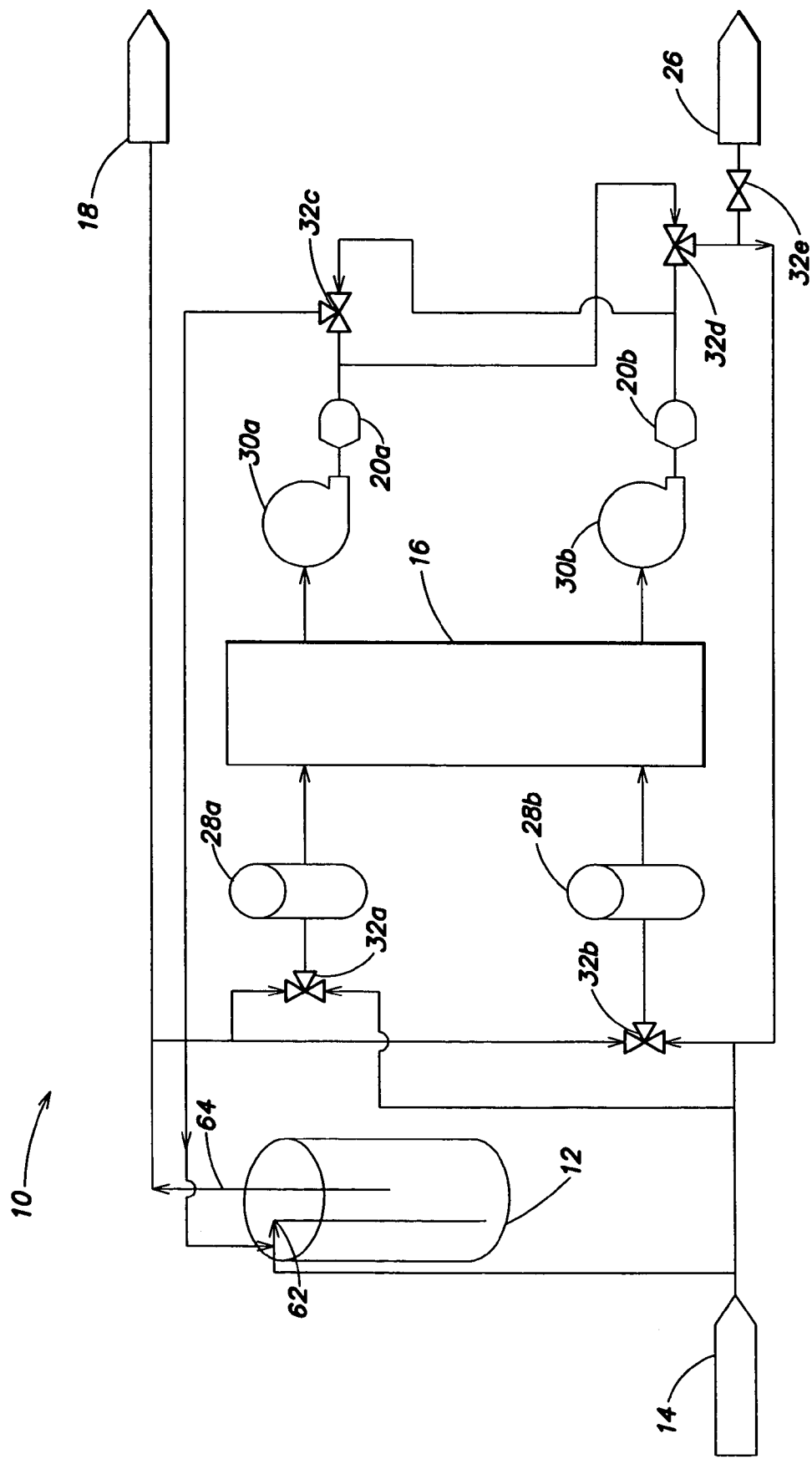
FIG. 5 is a schematic flow diagram of a water treatment system according to one embodiment of the invention as discussed in Example 3.

An in-line water treatment system, schematically shown in FIG. 5, was design operated and evaluated for performance. The water treatment system 10 had an electrodeionization device 16 and a vessel 12. Water from point-of-entry 14 was introduced into pressure vessel 12 through inlet 62. Water to be treated was withdrawn from pressurized storage vessel 12 and introduced into electrodeionization device 16 through either of valves 32a or 32b. The water treatment system also had pretreatment systems 28a and 28b upstream of electrodeionization device 16. Streams exiting electrodeionization device 16 was transferred through pumps 30a and 30b into either of pressurized storage vessel 12 or circulated back into electrodeionization device 16, depending on the service of valves 32c and 32d. Discharge to drain 26 of a concentrate stream was controlled by actuating valve 32e. Treated water was withdrawn from pressurized storage vessel 12 through outlet 64 and introduced as the product point of use 18. The water treatment system was controlled by a programmable controller (not shown) based on the measured water conductivity. The water treatment system was operated until a conductivity of about 220 µS/cm was achieved. Treated water from the water treatment system was withdrawn from pressurized storage vessel 12 and delivered to point of use 18 at a rate of between about 11 to about 14 gallons about every 3 hours. The flow rate through pumps 30a and 30b was monitored through flow meters 20a and 20b, respectively.

Electrodeionization device 16 was comprised of a 25 cell pair stack between expanded mesh ruthenium oxide electrodes. Electrodeionization device 16 was configured so that treated water or product flowed from the depleting compartments to the cathode compartments and the concentrate stream from the concentrating compartments circulated through the anode compartment. Each cell of the electrodeionization device was filled with about 40% AMBERLITE® SF 120 resin and about 60% AMBERLITE® IRA 458 resin, both available from Rohm & Haas Company, Philadelphia, Pa.

The programmable controller was a MICROLOGIX™ and 1000 programmable controller available from Allen-Bradley Company, Inc., Milwaukee, Wis.

An electric field was applied across the electrodeionization device and was reversed about every 15 minutes. The applied electric field across electrodeionization device 16 was initially operated at about 40 V and was changed to about 52 V.

Vessel 12 was about a 10-inch diameter fiberglass tank containing about 17 gallons. The feed pressure from point-of-entry 14 was about 30 psig. Flow rates in the diluting and concentrating streams was maintained at about 1.3 to about 1.4 liters per minute.

Pretreatment systems 28a and 28b was comprised of 5-inch carbon block filters with about a 0.5 micron rating. Additionally, a pretreatment system comprised of one depth filter and one 1-inch sediment filter was used to remove heavy particulates before introducing the water to be treated in vessel 12.

In one liquid circuit, water from vessel 12 was introduced through valve 32a into electrodeionization device 16 where it was treated. The treated water was returned to vessel 12 through pump 30a and valve 32c. In another liquid circuit, a concentrating stream flowing in a concentrating compartment of electrodeionization device 16 was circulated through pump 30b and directed by valves 32d and 32b. In another liquid circuit, water to be treated was withdrawn from outlet 64 of vessel 12 and introduced into a second depleting compartment of electrodeionization device 16 through valve 32b. The treated water exiting electrodeionization device 16 was then transferred back into vessel 12 by pump 30b and valve 32c. A fourth liquid circuit, comprising a concentrating stream from a second concentrating compartment of electrodeionization device 16, was circulated by operating pump 30a and directing the flow through valve 32c, 32d and 32a.

The water treatment system was operated under varying conditions and the operating parameters were measured and illustrated on FIGS. 6A, 6B, 7A, 7B, 8A and 8B. In each of the figures, an operating parameter was varied to evaluate the efficiency and performance of the water treatment system.

Figure 6A:
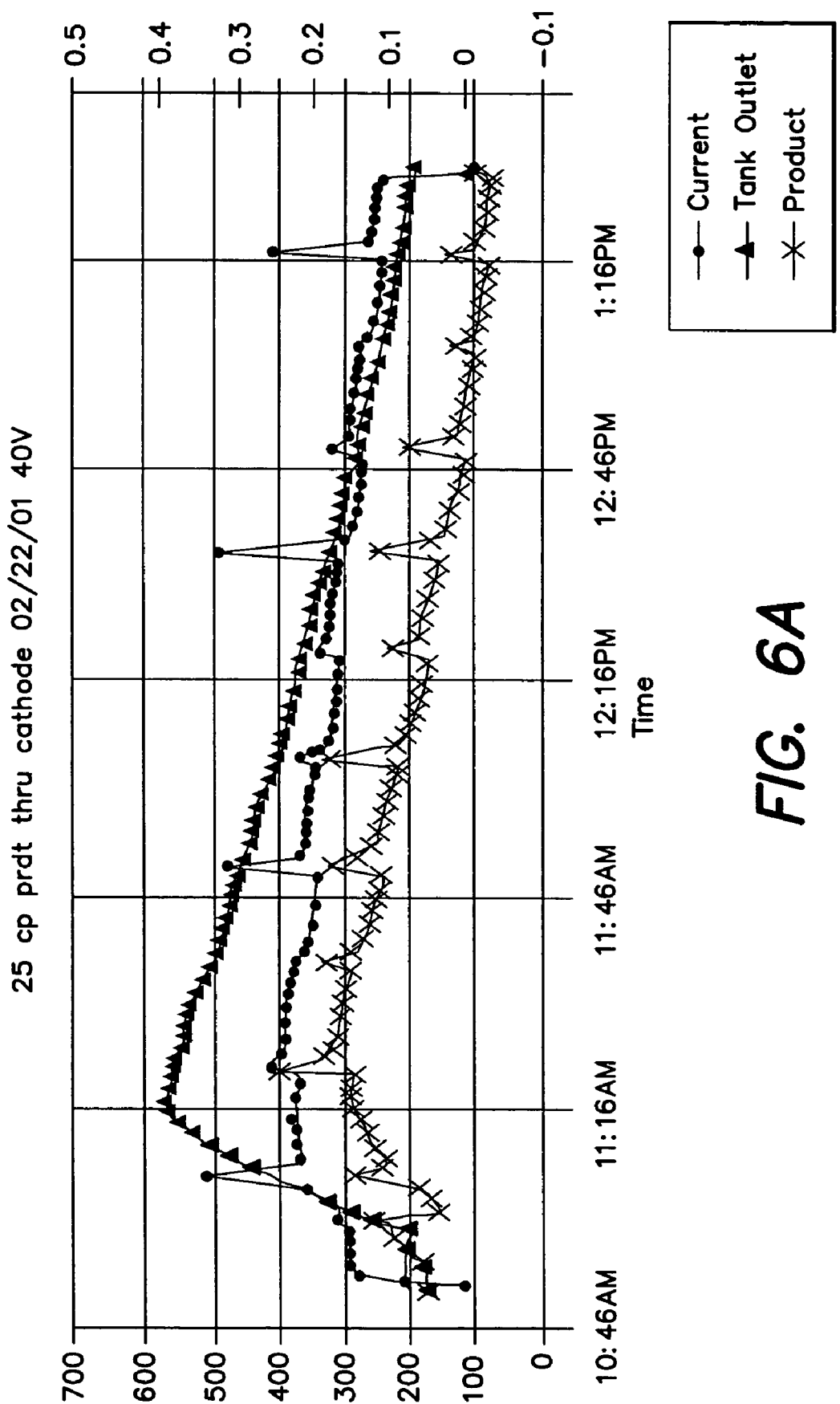
Figure 6B:
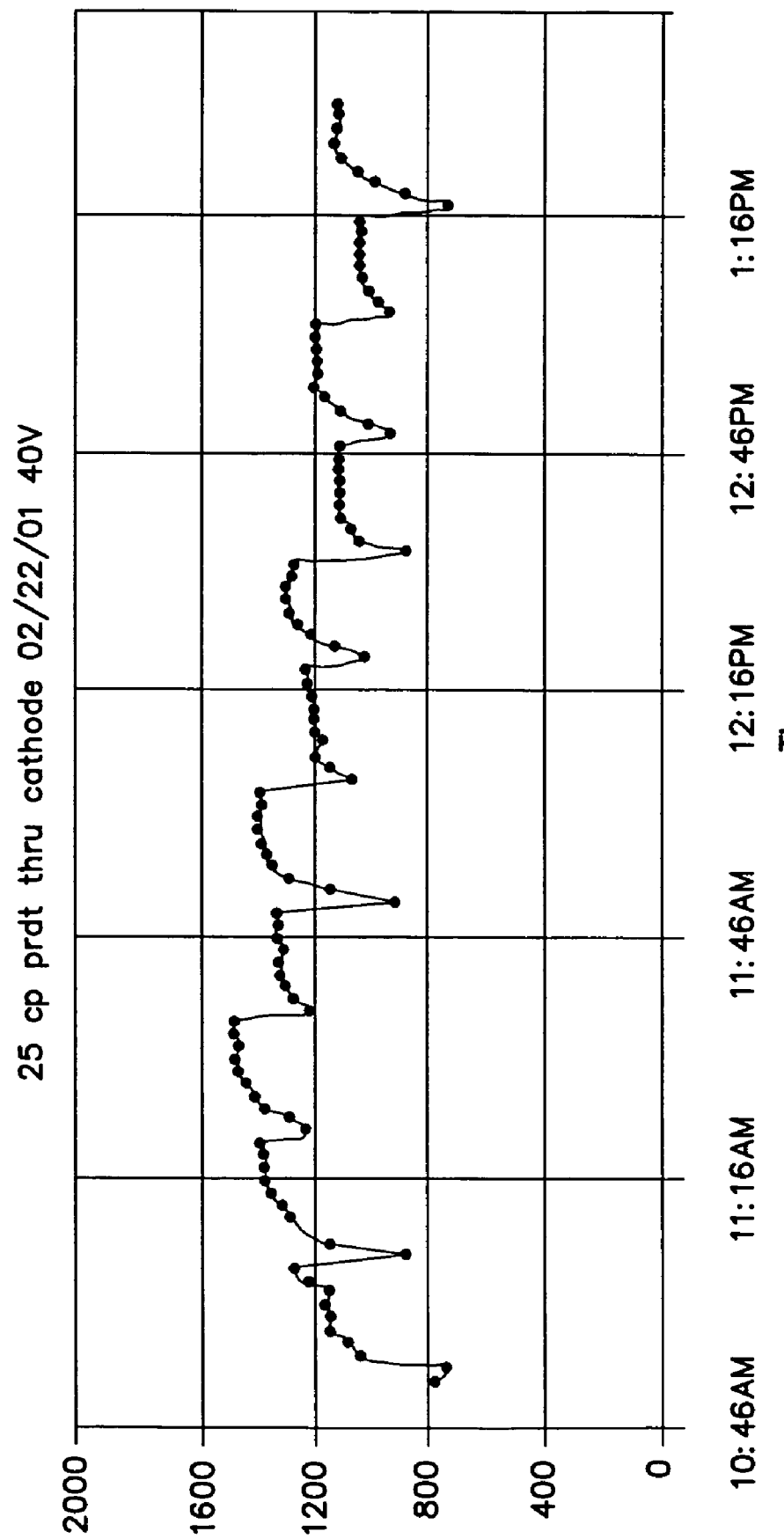

The water treatment system was operated so that an intermittent flushing or discharge of the concentrate stream to drain 26 occurred for about 6 seconds every 24 seconds. The volume discharged to drain was about 300 milliliters per minute. Product water was withdrawn from vessel 12 at a rate of about 12.5 gallons every three hours. At an applied electric potential of about 40 V, the electrodeionization device automatically shut down, after reaching the set point, and remained shut down for 25 minutes before the next product withdrawal, to point of use 18. The duration of the shutdown time represents the efficiency of the system in operation. FIGS. 6A and 6B show that under an applied potential of about 40 V, the water treatment system can be operated to produce softened water having a conductivity of about 220 µS/cm and a reject to drain cycle that drains intermittently.

Figure 7A:
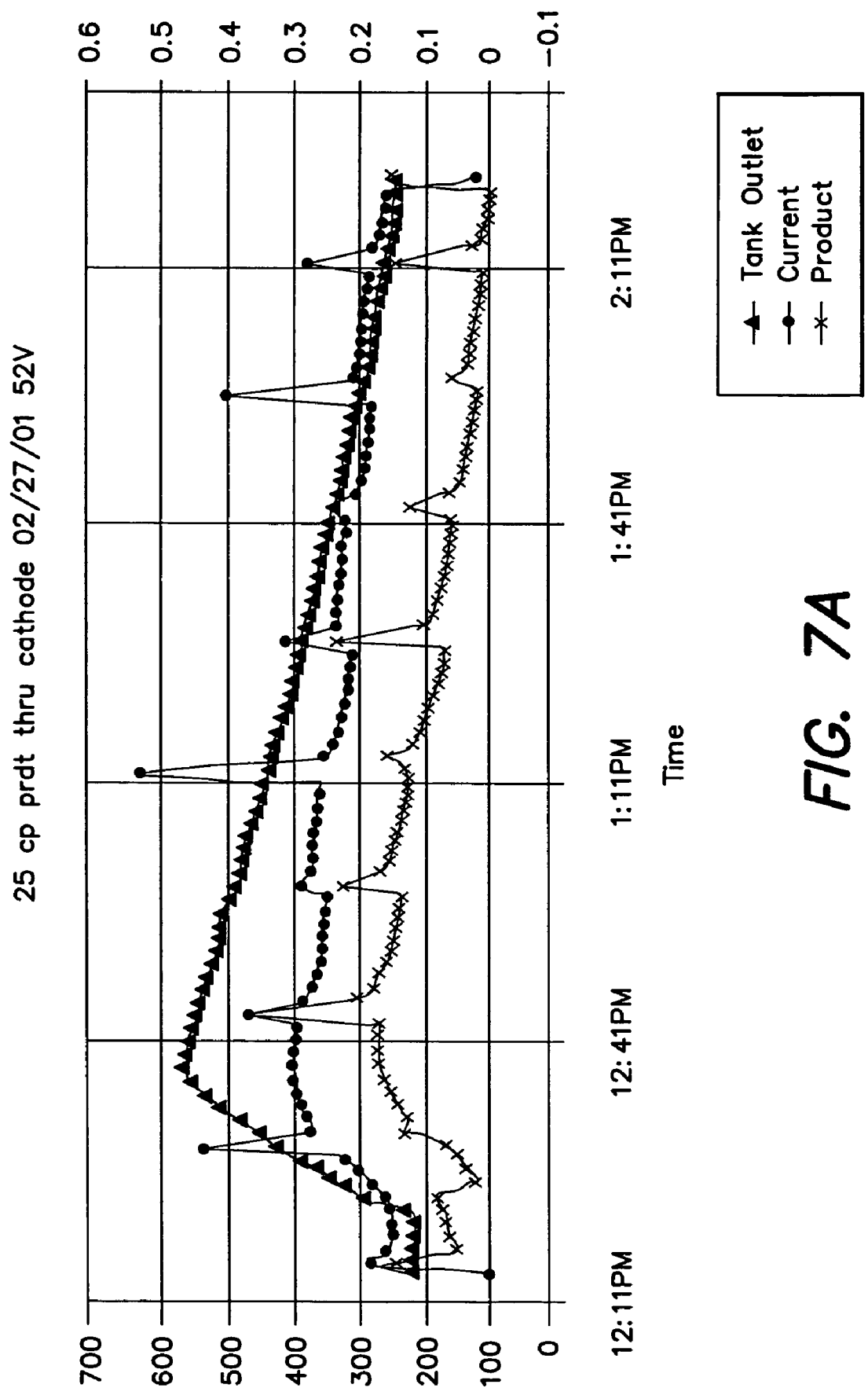
Figure 7B:
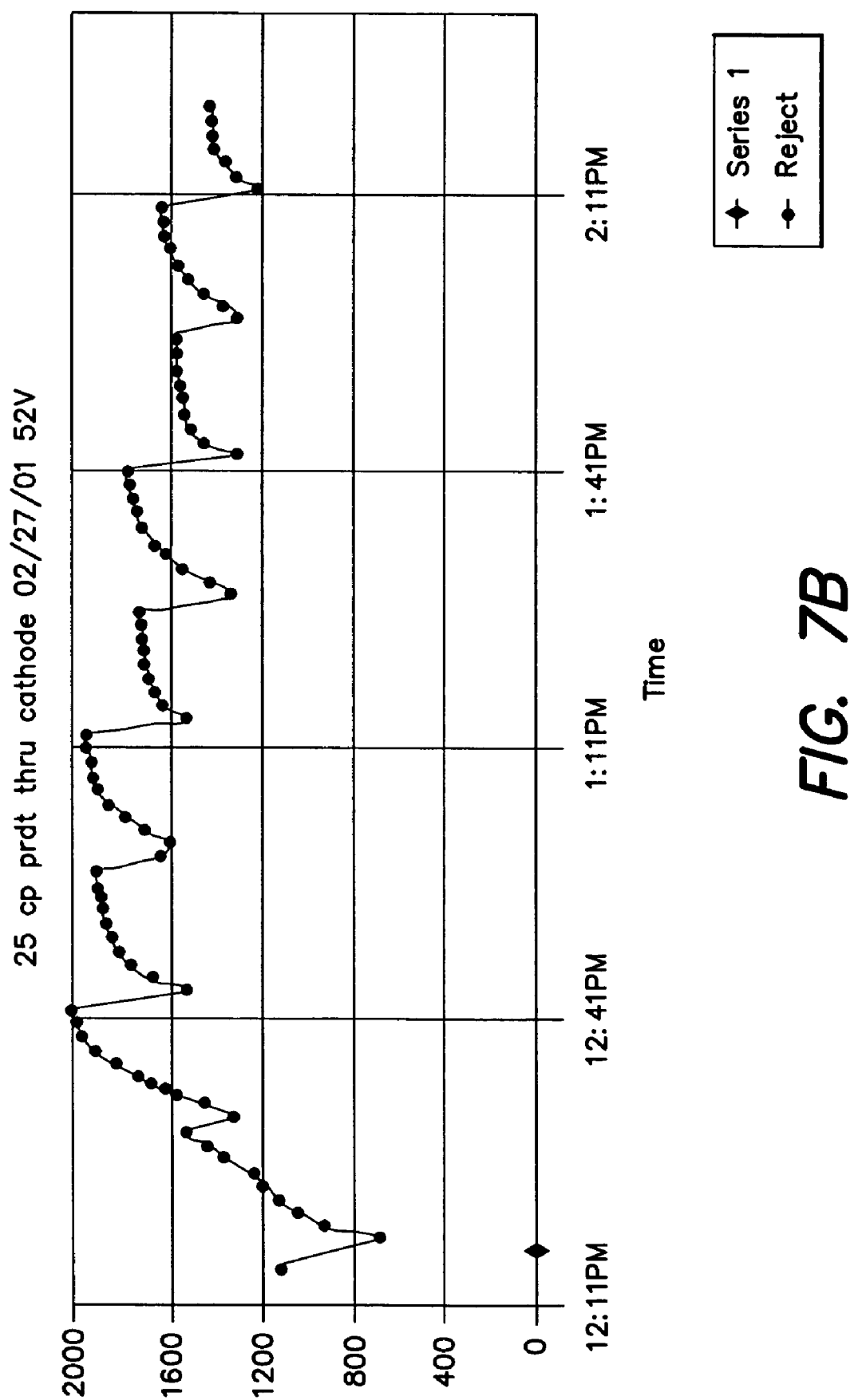

FIGS. 7A and 7B show operating data of the water treatment system operated under a higher potential of about 52 V and with a decreased flushing cycle of about 4 seconds about every 26 seconds. During operation, the electrodeionization device had a shutdown period of about 57 minutes. Product water was withdrawn from vessel 12 at a rate of about 11.7 gallons every about three hours. FIGS. 7A and 7B show that the water treatment system can be operated to produce treated water with a decrease in the amount of flushing time without a decrease in performance and water quality. Also, as shown in FIG. 7B and compared to FIG. 6B, the conductivity of the reject stream increased at the same time the duration of shutdown increased. Thus, FIGS. 7A and 7B show that the water treatment system can be operated to produce treated water at a higher efficiency as compared to the operating conditions associated with FIGS. 6A and 6B.

Figure 8A:
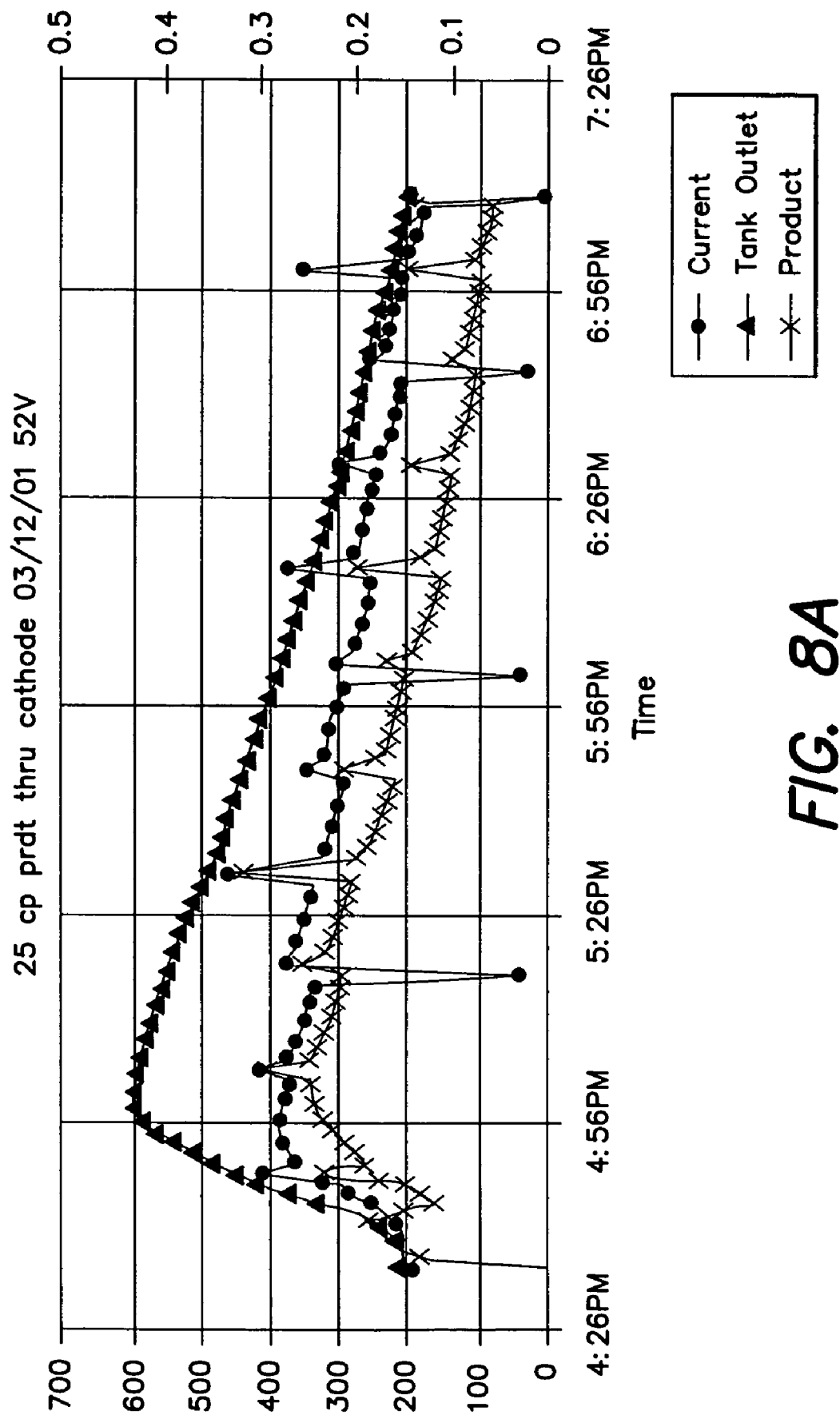
Figure 8B:
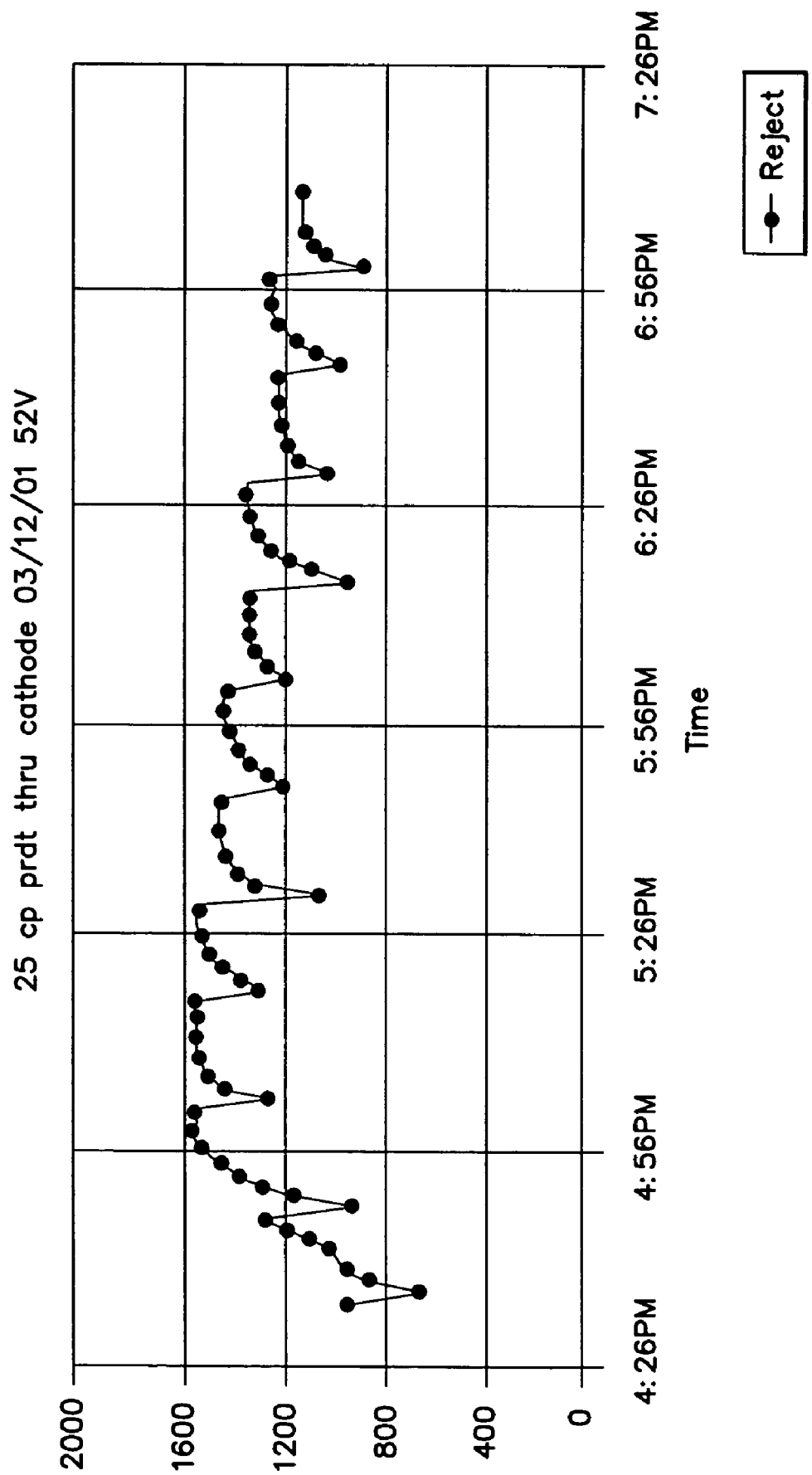

FIGS. 8A and 8B show the influence of an increased load on the water treatment system. The volume of the product to point of use 18 was increased to about 14 gallons every three hours. Under these operating conditions, the duration of shutdown time of the electrodeionization device decreased to about 30 minutes, as expected, because of the increased load. FIGS. 8A and 8B show that the system can still be operated with an increased load.

Those skilled in the art would readily appreciate that all parameters and configurations described herein are meant to be exemplary and that actual parameters and configurations will depend upon the specific application for which the systems and methods of the present invention are used. Those skilled in the art will recognize, or be able to ascertain using no more than routine experimentation, many equivalents to the specific embodiments of the invention described herein. For example, those skilled in the art can recognize that the present invention can be configured so that the electrodeionization device can be installed within the reservoir system when it is desirable to do so such as when installation space or volume is limited by existing equipment or structure or that a time delay can be used so that the electrodeionization device would be flushed for a predetermined period after shutdown. It is, therefore, to be understood that the foregoing embodiments are presented by way of example only and that, within the scope of the appended claims and equivalents thereto, the invention may be practiced otherwise than as specifically described. The present invention is directed to each individual feature, system, or method described herein. In addition, any combination of two or more such features, systems or methods, if such features, systems or methods are not mutually inconsistent, is included within the scope of the present invention. The present invention has been described using water as the fluid but should not be limited as such. For example, where reference is made to treated water, it is believed that other fluids that can be treated according to the present invention. Moreover, where reference is made to a component of the system, or to a step of the method, of the present invention that adjusts, modifies, measures or operates on water or water property, the present invention is believed to be applicable as well. Thus, the fluid to be treated may be a fluid that is a mixture comprising water. Accordingly, the fluid can be a liquid that comprises water.

What is claimed is:

1. An electrochemical device comprising:
   an anode compartment and a cathode compartment;
   a depleting compartment in ionic communication with at least one of the anode compartment and the cathode compartment;
   a concentrating compartment in ionic communication with the depleting compartment; and
   a positively-charged flow regulator comprising a flow orifice positioned downstream of the concentrating compartment.

2. The device of claim 1 further comprising a power source for applying a positive electrical charge to the positively-charged flow regulator according to a predetermined charge schedule.

3. The device of claim 1 wherein the positively-charged flow regulator comprises a valve.

4. The device of claim 1 wherein the positively-charged flow regulator comprises a graphite material.

5. The device of claim 1 wherein the positively-charged flow regulator comprises a diaphragm valve.

6. A system comprising:
   a point-of-entry;
   an electrodeionization device comprising a depleting compartment and a concentrating compartment, fluidly connected to the point-of-entry;
   a flow regulator fluidly connected downstream of the concentrating compartment;
   a power source operatively configured to provide an applied positive electrical charge on the flow regulator, and to provide an electric current through the electrodeionization device;
   a controller operatively coupled to the power source, and configured to regulate the applied positive electrical charge on the flow regulator according to a predetermined schedule, and further configured to reverse a polarity of the electric current through the electrodeionization device;
   a reservoir system fluidly connected to the depleting compartment; and
   a point of use fluidly connected to the reservoir system.

7. The system of claim 6 wherein the flow regulator comprises a valve.

8. The system of claim 6 wherein the controller is operatively coupled to the flow regulator, and configured to regulate the flow regulator to discharge a predetermined volume of a fluid according to a predetermined discharge schedule.

9. The system of claim 6 wherein the flow regulator comprises a plate having a flow orifice.

10. The system of claim 6 wherein the reservoir system has a pressure that is above atmospheric pressure.

11. The system of claim 6 wherein the point of use comprises a household appliance.

12. An electrodeionization device comprising:
    a cathode compartment and an anode compartment;
    a concentrating compartment fluidly connected upstream of the anode compartment;
    a depleting compartment in ionic communication with the concentrating compartment, and fluidly connected to the cathode compartment; and
    a flow regulator regulated by a controller according to a predetermined discharge schedule and fluidly connected downstream of the concentrating compartment for regulating a flow of a waste stream to a drain, the flow regulator has an applied positive charge.

13. The device of claim 12 wherein the flow regulator comprises a valve.

14. The device of claim 12 further comprising an electric power source configured to apply the positive charge on the flow regulator.

15. The device of claim 14 wherein the controller is configured to regulate the electric power source applying the positive charge according to a predetermined charge schedule.

16. A method of softening water comprising:
    introducing water to a depleting compartment of an electrochemical device to produce softened water;
    recirculating a concentrating stream in a concentrating compartment of the electrochemical device; and
    changing a pH of the concentrating stream proximate a flow regulator by applying an electrical charge on the flow regulator.

17. The method of claim 16 wherein changing the pH of the concentrating stream changes the pH to less than about 7.

18. The method of claim 16 wherein the electrical charge is applied according to a predetermined charge schedule.

19. The method of claim 18 further comprising measuring a property of the softened water.

20. The method of claim 19 wherein adjusting the pH comprises generating hydrogen ions.

21. The method of claim 19 wherein adjusting the pH comprises applying the electrical charge on the flow regulator according to a charge schedule.

22. The method of claim 21 further comprising adjusting the charge schedule based on the softened water property.

23. An electrodeionization device comprising:
a concentrating compartment with a flowing waste stream;
means for discharging a portion of the waste stream from the concentrating compartment to a drain according to a predetermined schedule; and
means for generating hydrogen ions in a fluid flowing through said discharging means.

24. The electrodeionization device of claim 23 further comprising means for adjusting the predetermined schedule.

25. An electrodeionization device comprising:
a concentrating compartment with a waste stream, and having ion exchange media therein;
means for discharging the waste stream to a drain according to a predetermined discharge schedule; and
means for applying a positive charge on the means for discharging the waste stream.

* * * * *